(12) United States Patent
Stahl

(10) Patent No.: US 11,725,350 B2
(45) Date of Patent: Aug. 15, 2023

(54) METHOD FOR CONTROLLING THE HEIGHT ADJUSTMENT OF A HEIGHT ADJUSTABLE RUNNING GEAR OF A SELF-PROPELLED GROUND MILLING MACHINE, IN PARTICULAR A ROAD MILLER, AND GROUND MILLING MACHINE

(71) Applicant: BOMAG GMBH, Boppard (DE)

(72) Inventor: Jonathan Stahl, Boppard (DE)

(73) Assignee: BOMAG GMBH, Boppard (DE)

( * ) Notice: Subject to any disclaimer, the term of this patent is extended or adjusted under 35 U.S.C. 154(b) by 0 days.

(21) Appl. No.: 17/445,886

(22) Filed: Aug. 25, 2021

(65) Prior Publication Data

US 2022/0064879 A1 Mar. 3, 2022

(30) Foreign Application Priority Data

Aug. 25, 2020 (DE) ...................... 10 2020 005 204.5

(51) Int. Cl.
*E01C 23/088* (2006.01)
*E01C 23/12* (2006.01)
*B60G 17/019* (2006.01)

(52) U.S. Cl.
CPC .......... *E01C 23/088* (2013.01); *E01C 23/127* (2013.01); *B60G 17/01908* (2013.01)

(58) Field of Classification Search
CPC ......... E02F 3/652; E02F 9/028; E02F 9/2257; B60G 17/01908; B60G 2800/912; B60G 2800/9123; E01C 23/088; E01C 23/127

(Continued)

(56) References Cited

U.S. PATENT DOCUMENTS 8,128,177 B2 3/2012 Menzenbach et al.
8,424,972 B2 4/2013 Berning et al.
(Continued)

FOREIGN PATENT DOCUMENTS

CN 101466899 6/2009
CN 102191744 9/2011
(Continued)

OTHER PUBLICATIONS

Office Action from related Chinese Appln. No. 202110978642.9, dated Oct. 8, 2022. English translation attached.

*Primary Examiner* — Abby J Flynn
*Assistant Examiner* — Michael A Goodwin
(74) *Attorney, Agent, or Firm* — Grossman, Tucker, Perreault & Pfleger, PLLC

(57) ABSTRACT

A method for controlling the height adjustment of a height-adjustable running gear of a self-propelled ground milling machine, and to a ground milling machine, in particular a road miller, comprising a machine frame, front and rear traction devices, wherein at least one rear traction device is connected to the machine frame by means of a height-adjustable lifting device, a milling drum mounted on the machine frame, a frame tilt sensor arranged on the machine frame and intended for detecting the tilt of the machine frame in the working direction, at least one ground-contact-element tilt sensor, arranged on a ground contact element, which is adjustable relative to the machine frame, and intended for detecting the tilt of the ground contact element in the working direction, and also a control unit, which controls the at least one rear height-adjustable lifting device depending on tilt data determined by means of the frame tilt sensor and the ground-contact-element tilt sensor.

17 Claims, 12 Drawing Sheets

(58) Field of Classification Search
USPC .......................................... 299/1.5; 404/84.1
See application file for complete search history.

(56) References Cited

U.S. PATENT DOCUMENTS

| | | |
|---|---|---|
| 2011/0298188 A1 | 12/2011 | Haubrich et al. |
| 2013/0021599 A1 | 1/2013 | Muller |
| 2013/0162003 A1* | 6/2013 | Killion .................. E01C 23/088 299/1.5 |
| 2014/0084665 A1 | 3/2014 | Motz et al. |
| 2019/0136469 A1 | 5/2019 | Steeg et al. |
| 2020/0062066 A1 | 2/2020 | Busley et al. |
| 2020/0122540 A1* | 4/2020 | Rife, Jr. ................... B60G 3/01 |
| 2020/0123716 A1* | 4/2020 | Engelmann ........... E01C 23/088 |

FOREIGN PATENT DOCUMENTS

| | | |
|---|---|---|
| DE | 102006027244 | 12/2006 |
| DE | 102010053038 | 7/2011 |
| DE | 102010050441 | 10/2011 |
| DE | 102012019016 | 4/2014 |
| DE | 102014000236 | 7/2015 |
| DE | 102010016183 | 10/2015 |
| DE | 102014010488 | 1/2016 |
| DE | 102015016678 | 5/2017 |
| EP | 1924746 B1 * | 4/2016 ........... B60G 17/015 |

\* cited by examiner

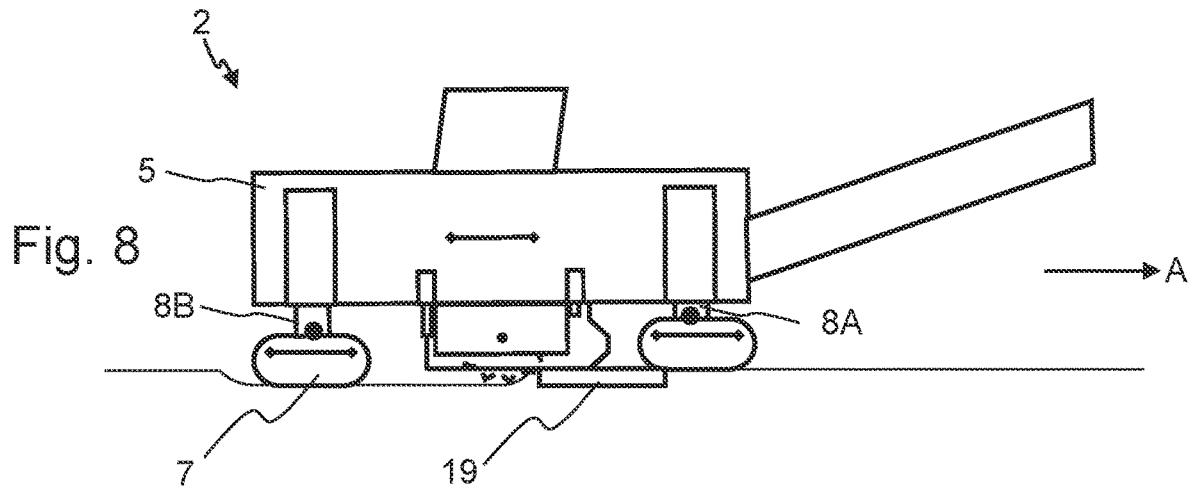
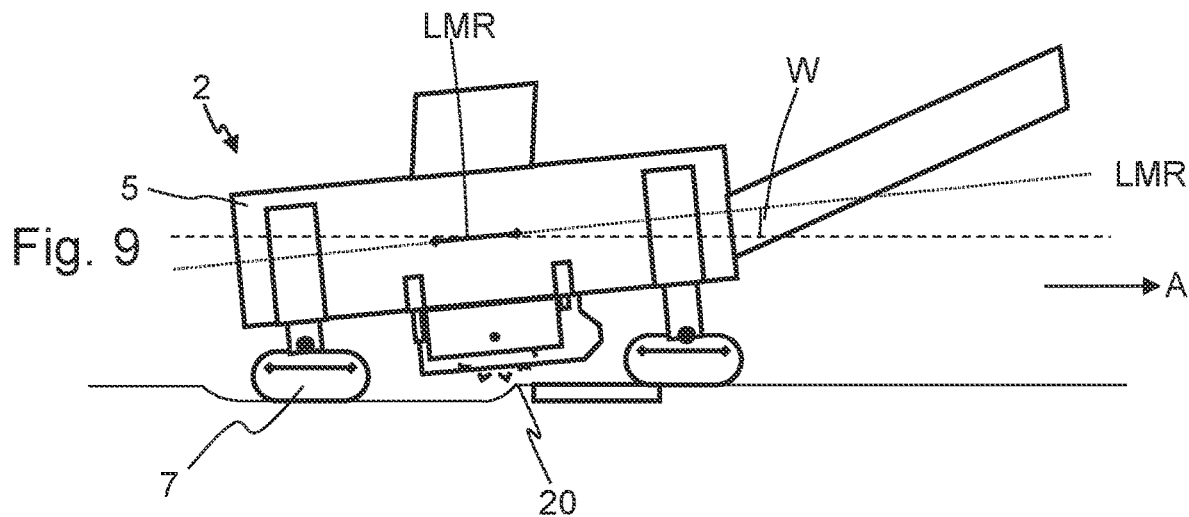
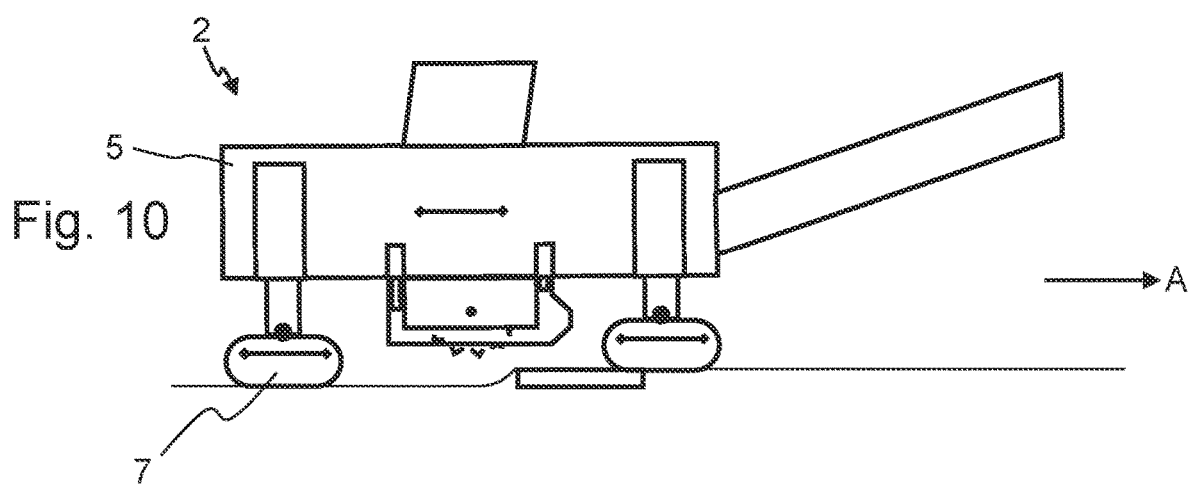

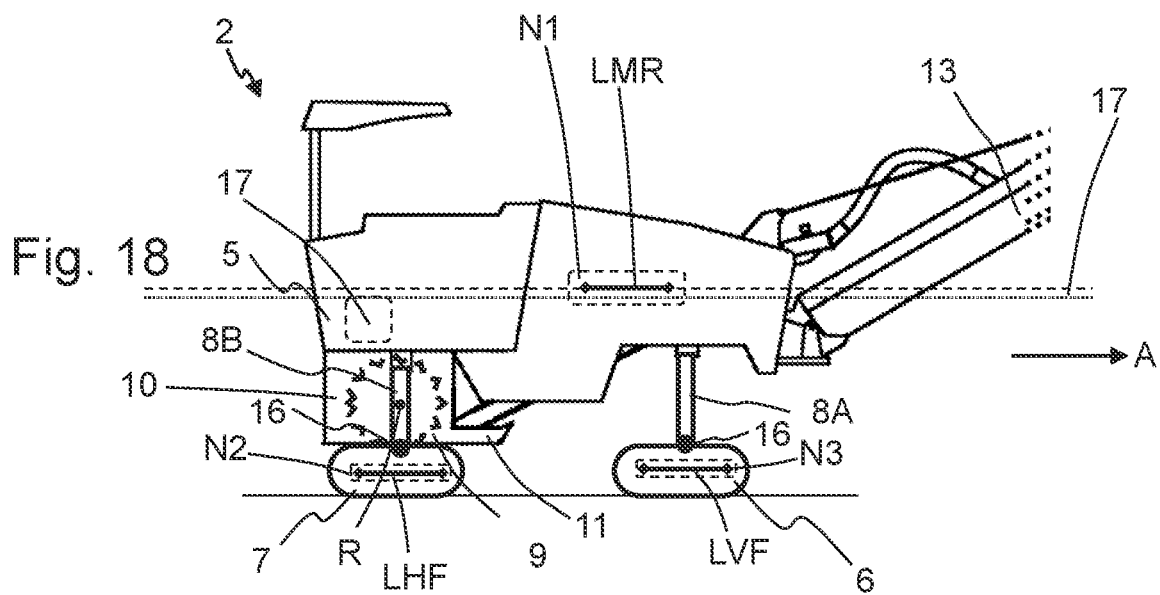
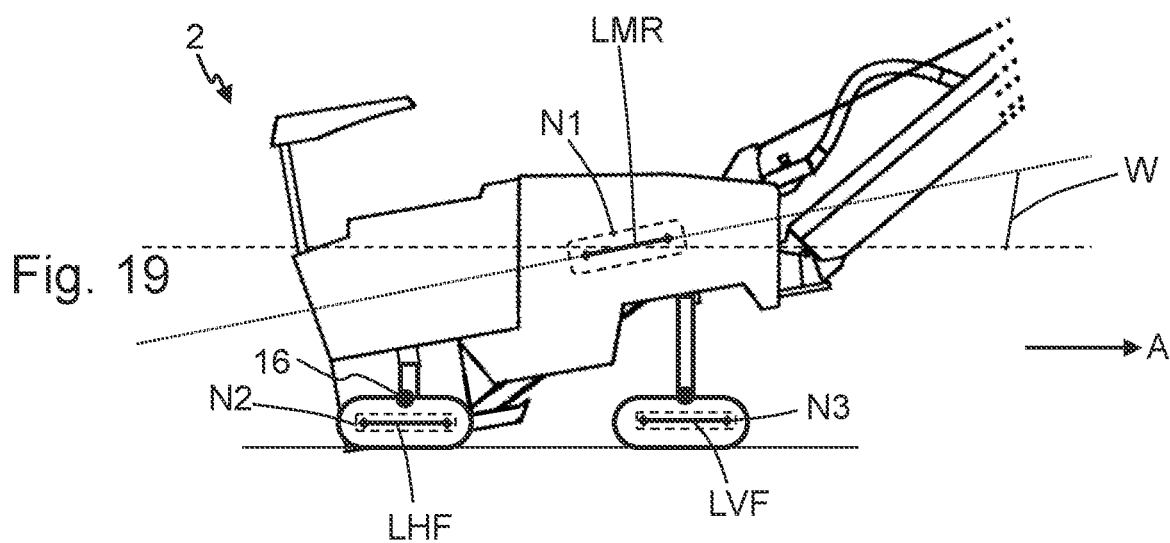
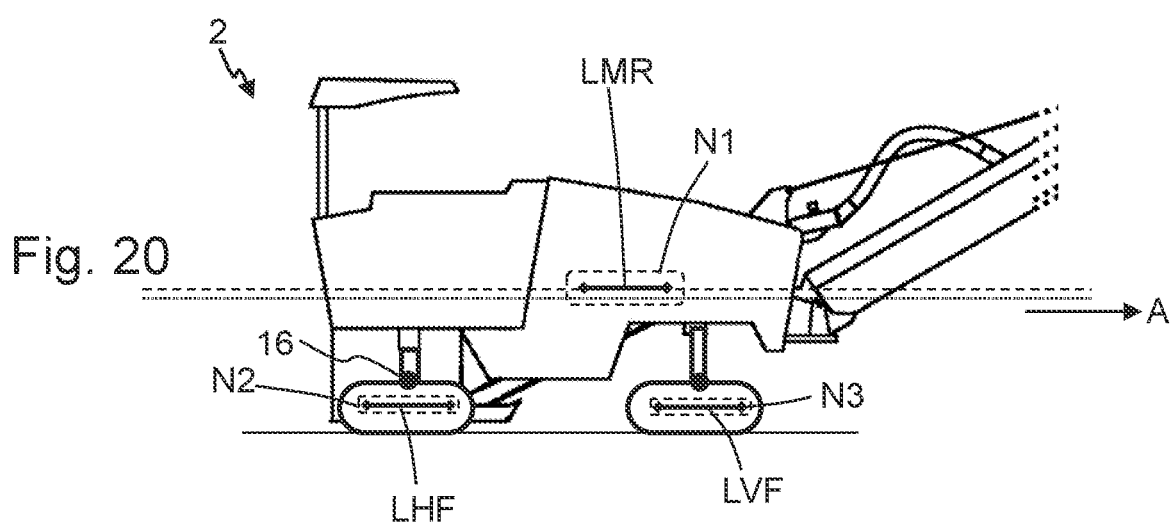

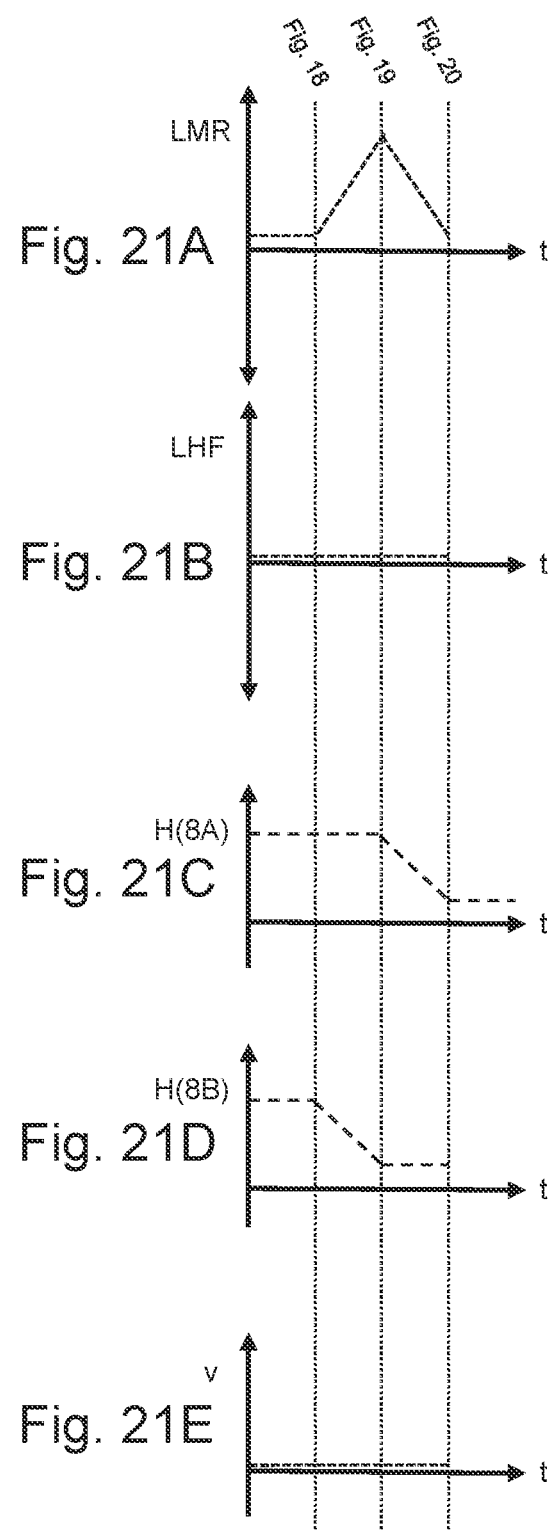

METHOD FOR CONTROLLING THE HEIGHT ADJUSTMENT OF A HEIGHT ADJUSTABLE RUNNING GEAR OF A SELF-PROPELLED GROUND MILLING MACHINE, IN PARTICULAR A ROAD MILLER, AND GROUND MILLING MACHINE

FIELD

The invention relates to a method for controlling the height adjustment of a height-adjustable running gear of a self-propelled ground milling machine, in particular a road miller, and to a ground milling machine.

BACKGROUND

Ground milling machines of the kind in question here are typically used in road construction to restore carriageways, where they are specifically used for removing the road surface to a desired milling depth. In this respect, it is known to lower a working device, which is in the form of a horizontal milling drum that is rotatable transversely to the working direction, into the subgrade as far as to a desired milling depth by adjusting the height of the machine frame in relation to the subgrade. For this purpose, the milling drum can be mounted on the machine frame of the ground milling machine, in particular inside a milling drum case, and can be adjustable in the vertical direction together with said frame by means of appropriate lifting devices. Lifting devices of this kind can, for example, be lifting columns that connect traction devices standing on the subgrade to the machine frame in a height-adjustable manner, as described in DE102010050441A1 for example. In this case, it is possible for all the traction devices of the ground milling machine to each be connected to the machine frame by means of a respective lifting device. This is the case in particular with "central-drum" millers, in which the milling drum is arranged between the front and rear traction devices when viewed in the longitudinal direction of the machine. DE102015016678A1 describes a central-rotor miller of this kind, for example. However, it is also known to connect only some of the traction devices to the machine frame in a height-adjustable manner, as is possible for example in "rear-drum" millers. Machines of this kind in particular can have either just one front traction device arranged in the middle in relation to the machine width, or two front traction devices that are mounted relative to one another by means of a swing axle and are height-adjustable collectively but not relative to the machine frame. In machines of this kind, the milling drum is arranged at the height of the two rear traction devices in the rear region of the machine. The two rear traction devices are each connected to the machine frame so as to be adjustable in height relative thereto by means of a respective lifting device, in particular lifting columns. In these machines in particular, it is also known to configure at least one of the rear traction devices so as to be pivotable between an inner final position, in which it is pivoted in front of the milling drum, and an outer final position, in which it can be pivoted next to the milling drum. By way of example, DE102014010488A1 describes a rear-rotor miller of this kind. As a purely precautionary measure, it is pointed out at this juncture that rear-rotor millers may, however, also have lifting devices for both front and rear traction devices.

During operation of ground milling machines of this kind, it is known to let the operator of the ground milling machine perform the height adjustment of the individual lifting devices manually and on an individual basis, for example for starting the milling operation and/or for raising the milling drum out of the subgrade, for example when finishing the milling work or when travelling over a ground obstacle, such as a manhole cover and/or a valve box. This evidently places greater requirements on the machine operator. To relieve the burden on the operator, it is known, for example from EP1924746A1, to provide position sensors within the lifting device and to use these sensor data to control the vertical adjustment of the ground milling machine. One aim of height adjustments of this kind may be to reach and maintain a desired milling depth. However, another objective in particular also concerns the operating convenience and travelling comfort for the operator inside the control platform of the ground milling machine. In particular, slanted positions of the machine (in particular relative to a virtual horizontal), whether in the transverse or longitudinal direction, or rocking movements of the machine when travelling over ground obstacles are perceived by the operator as being unpleasant. During a height adjustment of the ground milling machine, the machine frame should thus be kept as parallel as possible to the subgrade and/or to a virtual horizontal, in particular also a horizontal plane. This is particularly challenging when the milling operation is being started or ended, and in particular when the traction devices at the rear in the working direction travel over a milling edge. Machine movements of this kind may also be triggered when the front traction devices travel over edges on the ground, such as a milling edge, in particular when maneuvering. Therefore, in the present case this travelling movement, in particular of the rear and/or front traction devices, must be compensated for as automatically as possible by height adjustments in opposition to ground level changes, or at least a rocking movement of the machine should be reduced thereby in order to maintain the horizontal position of the machine in this operating scenario or at least to allow only an extremely small deviation.

SUMMARY

Overall, the object of the invention is therefore to improve the operating convenience of a generic ground milling machine, and preferably simultaneously to disclose an option for keeping the machine frame as parallel as possible with the subgrade, in particular when starting and ending the milling process.

One aspect of the invention relates to a method for controlling the height adjustment of a height-adjustable running gear of a self-propelled ground milling machine, in particular a road miller. By design, the ground milling machine suitable for carrying out the method according to the invention detects a machine frame. The machine frame is an essential load-bearing structure of the ground milling machine. Front and rear traction devices are connected to the machine frame. The traction devices can be wheels or crawler tracks. By means of the traction devices, the ground milling machine thus stands on the subgrade. Furthermore, the ground milling machine is preferably configured to be self-propelled. It comprises a drive motor, in particular a diesel engine, by means of which the drive energy required for the travel and working modes of the ground milling machine is generated. At least one traction device is connected to the machine frame by means of a height-adjustable lifting device. This can be one or more of the front traction devices and/or a rear traction device. A lifting device of this kind can in particular comprise a lifting column, comprising for example a hydraulic cylinder adjustable in the vertical direction and/or suitable guide elements, for example meshing guide sleeves. By way of example, DE102010050441A1 describes a lifting device of this kind. By means of the height adjustment of the lifting device, it is possible to adjust the vertical position and/or the tilt of the machine frame relative to the subgrade. To drive the lifting devices present, they can be connected to a suitable drive system, for example a hydraulic system, for the vertical adjustment of the ground milling machine. The ground milling machine further comprises a milling drum mounted on the machine frame. The milling drum can be a substantially hollow-cylinder carrier tube, on the outer circumferential barrel surface of which a plurality of chisel tools are arranged, which protrude in the radial direction and are typically mounted by means of suitable retainer systems. During milling operation, the milling drum is driven and rotated about a horizontal axis of rotation running transversely to the working direction. In this context, the working direction refers to the travelling direction of the ground milling machine when in working or milling mode, typically the forward direction. Further elements of the ground milling machine may be a control platform, an external operator's platform, one or more material conveying devices as described for example in DE102012019016A1, etc.

For the present invention, it is now essential that the ground milling machine for carrying out the method according to the invention further comprises a frame tilt sensor, which is arranged on the machine frame and intended for detecting the tilt of the machine frame in the working direction, i.e. the longitudinal tilt. This can be the tilt of the machine frame relative to a virtual horizontal plane, defined substantially by the gravitational field, and/or a tilt relative to the horizontal of the ground or of the contact area of the ground milling machine. Furthermore, however, a starting tilt which is a starting point for detecting future tilt changes can be established from a zero position that is defined, for example, in a starting position. This can be done manually or automatically, for example coupled to a trigger event, for example the retraction of one or more lifting devices. In this variant, therefore, the sensor has no external references and only relative position changes in terms of the tilt can be determined. In this context, the tilt in the working direction typically refers to the longitudinal tilt of the ground milling machine, in particular in relation to the zero position. Preferably, the zero position is defined in that the machine stands on a planar subgrade and the control platform floor, when viewed in the working direction, runs in a defined or desired position relative to the subgrade, in particular as parallel as possible with the subgrade. The zero position can, however, also be a defined starting position.

A further essential feature of the ground milling machine to be used for carrying out the method according to the invention is a ground-contact-element tilt sensor arranged on a ground contact element, which is moveable relative to the machine frame. When selecting the attachment site of the ground-contact-element tilt sensor, it is essential, in particular, that it is arranged on an element of the ground milling machine that is moveable relative to the machine frame, and also is influenced directly or indirectly by the form and/or course of the subgrade when in its position relative to the machine frame. The ground-contact-element tilt sensor is used to detect the tilt of the ground contact element in the working direction. In this case too, the determined tilt in the working direction can be the tilt of the ground contact element relative to a virtual horizontal plane, defined substantially by the gravitational field, and/or a tilt relative to the horizontal of the ground or of the contact area of the ground milling machine. Furthermore, however, a starting tilt which is a starting point for detecting future tilt changes can be established from a zero position that is defined, for example, in a starting position. In this variant, therefore, the sensor has no external references and only relative position changes in terms of the tilt can be determined. The tilt in the working direction also refers to the longitudinal tilt, i.e. the tilt in the longitudinal direction of the machine, in particular in relation to the zero position, for the ground-contact-element tilt sensor. The zero position of the ground-contact-element tilt sensor or the ground contact element can, for example, be defined by the ground milling machine as a whole being in its zero position as defined, and/or being specified by a suspended position, with no contact with the ground, of the ground contact element on the machine frame and/or in relation to a defined starting position. In this case too, the zero position is preferably defined in that the machine stands on a planar subgrade by means of a ground contact element that is either standing on the subgrade or floating, and in that the control platform floor, when viewed in the working direction, runs in a defined or desired position relative to the subgrade, in particular as parallel as possible with the subgrade. The ground contact element is preferably directly or indirectly mounted on the machine frame so as to be pivotable relative thereto, in particular pivotable about a horizontal axis of rotation running transversely to the working direction.

Lastly, the ground milling machine intended for carrying out the method according to the invention comprises a control unit, which controls the at least one height-adjustable lifting device depending on tilt data determined by means of the frame tilt sensor and the ground-contact-element tilt sensor. The control unit thus controls the vertical adjustment of the at least one lifting device of the at least one front or rear traction device. Preferably, the control unit controls all front and/or rear lifting devices. Particularly preferably, each of the traction devices is connected to the machine frame by means of a respective lifting device. For this purpose, the frame tilt sensor and the ground-contact-element tilt sensor send the control unit the tilt data that it has determined and monitored in particular in a manner dependent on the distance travelled and/or time. Furthermore, the control unit is configured to output control commands in such a way that the height position of the lifting device(s) can be controlled by means of these control commands. In other words, the control unit thus controls whether the lifting device(s) extend, remain in their current position or retract.

According to the invention, the lifting device(s) is/are controlled by taking account of tilt data and/or tilt-data changes determined by means of suitable sensors. Specifically, for the method according to the invention it is provided that, in a step A), a tilt of the machine frame in the working direction of the ground milling machine is determined and monitored. The tilt thus refers to the position of the ground milling machine, or of a reference line predefined on said machine and running in the working direction, relative or in relation to a virtual horizontal reference plane, the tilt angle specifically being determined from the course of a predefined reference line running in the direction of the longitudinal extent in the working direction of the ground milling machine in relation to the virtual horizontal plane, in particular defined by gravity. In addition to determining an absolute tilt or a specific tilt value, the method according to the invention equally comprises determining and monitoring a change in the tilt of the machine frame in the working direction. To do so, absolute tilt values need not be used, but rather this can also be based on relative tilt changes. For the method according to the invention, it is furthermore provided that a tilt of the ground contact element and/or a change in the tilt of the ground contact element in the working direction of the ground milling machine is determined and monitored. The tilt of the ground contact element can also be based on a reference line defined by the ground contact element in the working direction of the ground milling machine, for example the longitudinal extent thereof in the working direction of the ground milling machine, and the angular position thereof in relation to a virtual horizontal reference plane. These tilt data determined by means of the frame tilt sensor and the ground-contact-element tilt sensor can be used by the control unit to control the height adjustment of the lifting device.

Additionally or alternatively to step A), for the method according to the invention it can also be provided that, in a step B), a tilt difference between the tilt of the machine frame and/or a change in the tilt of the machine frame in the working direction, and a tilt of the ground contact element and/or a change in the tilt of the ground contact element in the working direction is/are determined and monitored. In this alternative method according to the invention, therefore, a zero position or starting position of the machine frame and the ground contact element is assigned to the two elements, for example by the operator, and the relative change of these zero positions or starting positions relative to one another is then tracked. By way of example, this can be done by the control unit on the basis of the tilt data and/or tilt-data changes of the machine frame and the ground contact element determined by means of the ground-contact-element tilt sensor and the frame tilt sensor, as described above.

Lastly, in a step C), the method according to the invention comprises controlling the vertical adjustment of the at least one lifting device of the at least one traction device connected to the machine frame by means of the at least one lifting device, depending on the determined and monitored tilt data and/or changes in tilt data of the machine frame and the ground contact element and/or depending on the tilt difference. In particular, in the present case the lifting control of at least one rear traction device or both rear traction devices is particularly relevant since the front traction devices are typically moved on the unmilled subgrade. Particularly in "central-rotor" millers, however, the traction devices at the rear in the working direction often run lower in the milling bed by the amount of the milling depth in the vertical direction. To do so, at the beginning of the milling process the rear traction devices have to run into the milling bed over the initial milling edge (ingress milling edge) and at the end of the milling process they have to run out of the milling bed over the terminal milling edge (egress milling edge). In particular, the operator of a ground milling machine often finds these two processes unpleasant when the at least one rear traction device travels over each milling edge with a rigid lifting device, as a result of which the relative position of the machine frame is significantly changed in terms of its tilt in the working direction. At the start of the milling process in particular, when the at least one rear traction device runs into the milling bed, this also has an impact on the milling depth of the milling device if this has not been compensated for accordingly by adjusting the lifting device. In this regard, it is now provided according to the invention that on the basis of the data obtained by means of the frame tilt sensor and the ground-contact-element tilt sensor, the control unit in particular detects when the at least one rear traction device is travelling over the initial milling edge and the terminal milling edge of a milling track, and compensates for this accordingly by extending and/or retracting the device to the extent that the position of the machine frame in relation to its longitudinal extent in the working direction of the ground milling machine, and thus the working depth of the milling drum in the subgrade, is ideally kept substantially constant. When viewed in the vertical direction, therefore, the control unit in particular compensates for the milling depth at the entry and/or exit milling edge by extending and/or retracting the lifting device(s), in such a way that the machine-frame movements in the vertical direction are as low as possible when travelling over these edges. According to the invention, this is done by using tilt data obtained by means of the frame tilt sensor and the ground-contact-element tilt sensor. These data are used in particular to detect and identify when the at least one rear traction device is travelling over a milling edge, and to control the extension and retraction to the extent that the machine-frame movement in the vertical direction is reduced as far as possible. Additionally or alternatively, it is also possible to control the front lifting device(s), for example in particular when the milling drum is lowered into the subgrade when starting the milling process. For rear-rotor millers in particular, this can be done by first retracting the rear lifting devices, for example manually or in an automatically controlled manner. As a result, the machine frame tilts backwards while the front traction devices do not change their tilt position. Once the desired milling depth is reached, the front lifting devices can now also be retracted and thereby tracked until the machine frame has resumed its starting tilt. In this case, therefore, at least one of the front traction devices and/or a side plate, for example, comprises a tilt sensor. The above-described method steps can also run incrementally, i.e. step-by-step, in that, when a predefined tilt change is reached, the relevant lifting devices are tracked in the first instance, not just when one of the lifting devices reaches the final position.

Additionally or alternatively, these steps can also run in a threshold-dependent manner. In the present case, this should be understood to mean that when a tilt threshold is exceeded the control unit automatically initiates measures that counteract an increase in the relevant tilt value in terms of magnitude. In a specific example in this context, for example, the front lifting columns in a ground milling machine can be retracted for the purpose of the ingress of the milling drum into the subgrade. As a result, the ground milling machine tilts forwards and downwards with its machine frame. If a defined tilt threshold, or one stored in the control unit for example, is exceeded in terms of magnitude, this can trigger simultaneous retraction of the rear lifting columns by the control unit. In this phase, therefore, the front and rear lifting devices are retracted simultaneously and concurrently with one another, ideally at the same retraction rate, such that in this operating phase the machine frame is lowered without any further change to the machine frame tilt. In this case, the rear lifting devices thus automatically track the front lifting devices, which are controlled, for example, manually or by means of a control program. In this case, the front lifting devices are thus the leading lifting devices and the rear lifting devices are the tracking lifting devices. When the front lifting devices reach their final retraction position, the rear lifting devices tracking the front lifting devices subsequently retract, ideally as far as to reach the starting tilt of the machine frame again, for example in parallel with the subgrade. The tracking lifting devices are thus vertically adjusted depending on the machine-frame longitudinal tilt, whereas the leading lifting devices are vertically adjusted according to other criteria, such as a manual vertical adjustment and/or automatically depending on a predetermined milling depth to be reached. In this operating example, the ground contact element does not change its tilt position. It is also possible for a height adjustment of the rear lifting devices to control a height adjustment of the front lifting devices, or for the front lifting devices to track the rear lifting devices when a longitudinal-tilt threshold of the machine frame is exceeded, as described above. In addition, the tracking lifting devices can be adjusted in terms of their vertical-adjustment rate slightly more quickly than the leading lifting devices. As a result, a kind of "catch-up effect" is achieved in terms of the current vertical adjustment of the leading and tracking lifting devices, whereby vertical-adjustment phases of "front only" or "rear only" can be shortened again.

According to the invention, the tilt threshold is selected to be as small as possible in order to keep the time lag between the height adjustment of only the front or only the rear lifting devices as short as possible compared with simultaneously moving the front and rear lifting devices. At the same time, the tilt threshold is also selected to be so large as to achieve a certain system inertia and thus prevent hyperreactive behavior of the tilt-dependent height adjustment. In terms of magnitude, a particularly preferable tilt threshold of the machine-frame longitudinal tilt is, for example, >1°, in particular >1.5°, and/or <5°, in particular less than 30, relative to a zero position.

It is possible to retract or extend the lifting devices simultaneously, at least transitionally, in particular by means of the above-described threshold-based longitudinal-tilt control, when the ground milling machine is stationary, but doing so also in travel mode, for example when travelling over a ground obstacle, is expedient and covered by the invention. Ultimately, by means of the interaction between the machine-frame tilt sensor and the ground-contact-element tilt sensor, certain operating scenarios can be identified, for example travelling over a ground obstacle when in travel mode. By means of the machine-frame tilt sensor, the predefined tilt threshold and the threshold-based simultaneous tracking of the other lifting devices (front or rear), an at least substantially parallel orientation of the machine frame relative to the zero position can simultaneously be maintained even when travelling over a ground obstacle. A driver of the ground milling machine will find this particularly pleasant since rocking movements of the machines can be significantly reduced as a result. It is therefore preferable for the vertical adjustment of the lifting device of a front traction device to be controlled at the same time as the vertical adjustment of a rear traction device, or vice versa.

The tilt data to be obtained by means of the ground-contact-element tilt sensor can be determined in different ways. However, it is preferable for the determination of the tilt and/or the change in the tilt of the ground contact element and/or the tilt difference to comprise determining the tilt and/or the change in the tilt of a crawler track and/or a side plate, in particular in relation to a longitudinal and/or reference axis running in the working direction of the ground milling machine. When a crawler track is used, it has to be borne in mind that it usually has a longitudinal extent running between a drive wheel and a guide wheel. In ground milling machines, therefore, a crawler track of this kind is usually hinged to the lifting device so as to be pivotable about a horizontal axis running transversely to the working direction by means of a pivot joint. This is disclosed for example in DE102014000236A1, to which reference is thus made for explanatory reasons. The pivot joint allows the crawler track to be moveable relative to the lifting device and thus also relative to the machine frame in relation to its tilt running in the working direction or longitudinal direction. The current pivot position of the crawler track is in particular also predetermined by the current ground conditions. On the other hand, a side plate usually refers to a shield that is arranged on the front of a milling drum case relative to the milling drum and by means of which, for example, the discharge of material out of the interior of the milling drum case in the axial direction is prevented. For this purpose, the side plate rests on the subgrade during milling operation and is carried along with the rest of the frame in a floating manner. For this purpose, the side plate is typically mounted in a height-adjustable manner and so as to be pivotable relative to the machine frame. In this respect, the current pivot or tilt position of the side plate depends in particular on the current ground conditions. Both the crawler track and the side plate are thus adjustable, in particular rotatable, relative to the machine frame depending on the ground conditions in relation to said machine frame, and their relative tilt in the working direction or with respect to the longitudinal extent of the machine frame can be varied. According to the invention, therefore, it is preferable that the tilt data of the ground-contact-element tilt sensor required according to the invention for controlling the lifting device are obtained by means of a tilt sensor, which is arranged in such a way as to deliver data on the tilt or tilt change of the crawler track and/or the side plate in the working direction of the ground milling machine, in particular relative to the machine frame. For this purpose, the at least one tilt sensor can be arranged directly on the at least one rear crawler track or on the side plate of the ground milling machine. However, it is also possible to use determination methods in which the tilt sensor is arranged, for example, on the machine frame and tilt data of the side plate and/or of the at least one rear crawler track are determined by distance measurement. This can be done, for example, by means of a distance measurement of a fixed point, for example on the machine frame, a driving console, a lifting device, the milling drum case, etc. from two points on the ground contact element that are spaced apart from one another in the longitudinal direction.

It is advantageous if the determining and monitoring according to steps a) and/or b) are performed in a manner dependent on the distance travelled and/or time. "In a manner dependent on the distance travelled" means that the control unit relates tilt data determined by means of the frame tilt sensor and/or the ground-contact-element tilt sensor and/or the change thereof to a distance covered by the ground milling machine. These data can be determined, for example, by means of a distance measurement device, which, for this purpose, can for example comprise an optical distance measurement device, for example for optically measuring the distance above ground, and/or a distance measurement device arranged on at least one of the traction devices, for example a speed sensor. By linking the tilt data and/or the change thereof to distance data, it is, for example, particularly reliably possible to monitor a distance covered corresponding to the spacing between the milling drum and the at least one rear traction device in the working direction; this, for example, can make it simpler to identify when the entry and/or exit milling edge is being travelled over. Additionally or alternatively, time-dependent linking of the determined tilt data and/or the change thereof is also possible and preferred. In particular, therefore, time-dependent linking means that tilt data and/or the change thereof are taken into account by the control unit in a time-dependent manner. By way of example, this makes it simpler to assign tilt changes to height-adjustment movements of lifting devices, in particular when a ground milling machine is stationary, as may be the case, for example, when the milling drum is being lowered at the start of a milling operation and/or when the milling drum is being raised out of the subgrade when travelling over a ground obstacle. It goes without saying that, for the purpose of the time-dependent assignment, the control unit can comprise a suitable time-detecting device, such as a timer module or the like.

To be able to assign tilt data determined by the frame tilt sensor and/or the ground-contact-element tilt sensor(s) and/ or the change thereof to particular usage scenarios as precisely as possible, it is advantageous furthermore if additional operating statuses are fetched and monitored, in particular monitored by suitable sensors, in order to control the vertical adjustment. It is particularly advantageous in this context, for example, if an operating status of the milling drum is determined in addition. This relates in particular to a check as to whether the milling drum is currently stationary or rotating about its axis of rotation; this can be monitored, for example, by means of a suitable speed sensor on the milling drum. Additionally or alternatively, a drive element located in the drivetrain from the drive motor to the milling drum can be monitored for a drive movement, for example an element of a belt drive, an epicyclic gearing, a hydraulic drive pump, a hydraulic drive motor, etc. By means of this information, for example, a distinction can be drawn between whether the ground milling machine is currently in milling mode or, for example, a transport mode, in which the ground milling machine is moving over the subgrade but the milling drum is not engaged with the subgrade. Additionally or alternatively, an operating status of at least one of the traction devices can also be determined. In particular, this makes it possible to check whether the ground milling machine is currently in a stationary or travelling state. Suitable sensors for this purpose may be, for example, speed sensors on the traction devices and/or optical devices, such as scanners and/or video cameras, that detect the subgrade ("above ground"). It may also be advantageous if, additionally or alternatively, the operating status of the drive motor, in particular of a diesel engine, an electric motor or a hydraulic motor, is determined. Depending on the machine configuration, for this purpose, for example, it may be possible to distinguish between a main mode and a maintenance mode, during which, for example, only limited machine functions are available. This can be used in particular to differentiate between acceptable tilt changes that do not need compensating for by the control unit, for example in some cases when in maintenance mode, and unacceptable tilt changes that need compensating for, when in milling and/or transport mode for example. Furthermore, determining the lifting status of a lifting device of one or more front traction devices and/or of all the lifting devices can also be provided additionally or alternatively. For this purpose, suitable position devices (capacitive sensors, cable sensors, etc.) that deliver a signal corresponding to the current height adjustment of the relevant lifting device can be provided. By way of example, DE102010050441A1 describes measurement devices of this kind. Furthermore, operator inputs can also be used additionally or alternatively in this case. For example, it is possible to determine a manually actuated vertical adjustment of the front or rear lifting devices by detecting the appropriate operator input and thus assign tilt changes of the machine frame to that event.

In principle, it is also possible for the ground milling machine to overall comprise just one rear or front traction device, or two rear and/or front traction devices, the tilt in the longitudinal direction being able to be determined just once, as described above, for example in relation to the width of the machine in a side region of the ground milling machine or in the middle. However, it may also be advantageous to determine tilt data in relation to the longitudinal tilt in the manner described above, in particular simultaneously at a plurality of points, in particular in each case in the region of mutually opposing sides of the ground milling machine, for example in each case at two rear traction devices or at two mutually opposing side plates. In other words, the determining and monitoring of the tilt and/or of the change in the tilt and/or of the tilt difference according to steps A) and/or B) are preferably performed separately from one another on both sides of the ground milling machine, and especially preferably concurrently and simultaneously. This relates in particular to determining the tilt data by means of the ground-contact-element tilt sensor. A particular advantage of this preferred development is that, when there are two rear or two front traction devices for example, the lifting positions of the two lifting devices, each connecting one of the traction devices to the machine frame, can be incorporated into the current control. This is particularly advantageous in the event of an operating scenario in which the two rear or front traction devices are not running on a common surface or at the same height, as may be the case, for example, when the milling is performed along a milling edge running in the working direction and/or along an obstacle extending in the working direction, for example a kerb. A scenario of this kind may occur, for example, particularly when the ground milling machine is a "rear-rotor" miller, in which one or both of the rear traction devices may run axially in front relative to the milling drum. Additionally or alternatively, this may also be particularly advantageous when the two front or two rear traction devices are not positioned at a common height or the axes of rotation thereof are not running coaxially with one another, as may also be the case, for example, in rear-rotor millers having a swivellable rear support wheel, as described in DE102010050441A1.

The method according to the invention can furthermore be developed to the effect that the obtained tilt data are used for controlling the tipping of the ground milling machine; this is particularly advantageous since generic ground milling machines often have a comparatively high center of gravity. In relation to at least one absolute tilt and/or change in the tilt and/or tilt difference, therefore, a threshold can preferably be stored and monitored by the control unit in case the value exceeds or drops below it. In the event that the value exceeds or falls below said threshold, in a further step the control unit initiates measures that counteract tipping of the ground milling machine. In a very simple variant, this can involve, for example, an optical and/or acoustic warning alert being output to the operator. Additionally or alternatively, the control unit can trigger an emergency stop with the effect that machine movements (machine propulsion, height-adjustment measures, etc.) can be stopped and prevented for the time being. It can also be provided that the control unit automatically initiates active anti-tipping measures by adjusting, for example, any lifting devices in a direction that counteracts the existing tipping risk. Additionally or alternatively, in a situation of that kind, attached components, such as an external conveyor belt, can be automatically directed by the control unit into a position that counteracts the tipping risk.

It is preferable if, on the basis of at least one operating parameter of the ground milling machine and a determined and monitored tilt and/or change in tilt and/or tilt difference, the control unit carries out a plausibility check to ascertain whether or not a change in the tilt and/or the tilt difference is associated with a milling process. The plausibility check thus refers to a checking function that checks the plausibility of the conclusions drawn by the control unit on the basis of the available tilt data, by means of at least one operating parameter of the ground milling machine. By way of example, a plausibility check of this kind can be carried out when it is detected that an initial or terminal milling edge is being travelled over by fetching the operating parameter "travel function". If, in a situation of this kind, the ground milling machine is stationary, the conclusion of the control unit that a milling edge is currently being travelled over is not plausible. This can trigger consequential measures, such as an appropriate indication to an operator, stop functions, etc. If, however, the ground milling machine is currently in a movement state, the conclusion of the control unit that the ground milling machine is currently travelling over an entry or exit milling edge, or initial or terminal milling edge, is plausible. Additionally or alternatively, for example, the mode of the milling drum can be fetched as an additional operating parameter. If, on the basis of the available tilt data, the control unit concludes that the ground milling machine is in the working mode or milling state, this can be confirmed as being plausible by fetching the operating status of the milling drum and if the milling drum is actually in the rotating state, or classified as implausible if the milling drum is currently stationary. For this plausibility check to be carried out by the control unit, therefore, the control unit can in particular also be configured so as to use, in addition to tilt data, further measurement data of operating status sensors, such as from a speed sensor, which detects the rotational movement of the milling drum and/or one of the traction devices, etc. The monitoring of operator inputs can also be included here.

The control unit can thus preferably comprise a control loop, on the basis of which the machine frame can be kept as parallel as possible to the subgrade by means of the determined and monitored tilt(s) and/or change in the tilt(s) and/or the tilt difference, or the corresponding tilt data. By way of example, the control loop can have, as a reference variable, a defined, for example parallel, orientation relative to the subgrade, in particular for example of the control platform. Additionally or alternatively, this can be based on a defined starting position, which can in particular be freely selected, relative to the subgrade, said position being predefined manually by the driver at the start of a work operation, for example. It is also possible to control the orientation of the machine frame in relation to an instrument horizon proceeding from the machine frame. The longitudinal tilt of the machine frame, and in particular of the control platform, is thus intended to be kept as constant as possible relative to the subgrade. Changes to the longitudinal-tilt orientation of the ground milling machine can in particular be determined by means of the frame sensor and/or the tilt ratio of the tilt data determined by means of the frame tilt sensor and the ground-contact-element tilt sensor. Deviations occurring in particular in relation to the longitudinal tilt of the machine frame, which occur for example due to changes in the ground profile, such as when travelling over a milling edge, etc., can be counteracted by the control unit in a targeted manner by means of a controlled adjustment of the at least one lifting device. The vertical adjustment is carried out to the effect that the tilt change that has occurred is counteracted towards the starting value. In addition, for this purpose it is possible to use the measurement signals of a plurality of tilt sensors, for example at different sites of the machine frame, on the traction devices, etc. This makes it possible in particular to carry out a more detailed plausibility check, as described above.

A further aspect of the invention relates to a self-propelled ground milling machine, in particular to a road miller. A ground milling machine of this kind comprises a machine frame, front and rear traction devices, at least one traction device, in particular the rear and/or the front traction devices, being connected to the machine frame by means of a height-adjustable lifting device, a milling drum mounted on the machine frame, a frame tilt sensor arranged on the machine frame and configured so as to detect and monitor the tilt and/or the tilt change of the machine frame in the working direction, i.e. the longitudinal tilt of the machine frame, a ground-contact-element tilt sensor, arranged on a ground contact element, which is adjustable relative to the machine frame, and configured to detect and monitor the tilt and/or the tilt change of the ground contact element in the working direction, i.e. in particular in the direction of the longitudinal axis of the machine frame, and also a control unit, which is configured to control the height adjustment of the at least one height-adjustable lifting device, the control unit controlling the height adjustment of the lifting device depending on tilt data determined and/or monitored by means of the frame tilt sensor and the ground-contact-element tilt sensor. The tilt is preferably determined in relation to a virtual horizontal plane, in particular an instrument horizon positioned on the ground milling machine. For further explanation, express reference is made at this juncture to the statements made with reference to the method according to the invention. Accordingly, it is also particularly preferable for the control unit of the ground milling machine to be configured to carry out the method according to the invention. Additionally or alternatively, it is also preferable for the control unit to be configured to automatically control the height adjustment of the front and/or rear lifting devices.

As regards the specific configuration of the frame tilt sensor and/or the ground-contact-element tilt sensor, use can be made of various sensors suitable for determining and monitoring the relevant tilt. These may be, for example, an optoelectronic tilt sensor, a tilt sensor comprising a riser and/or a tilt sensor comprising a ferromagnetic liquid. Examples of suitable tilt sensors are described, for example, in DE102010016183B4, DE102010053038A1 or DE102006027244A1. In the present case, gyro sensors or position sensors having an electromagnetically mounted pendulum are particularly suitable for use as a tilt sensor.

There exist other possible variants of the ground milling machine according to the invention, for example in terms of the specific arrangement of the ground-contact-element tilt sensor. Said sensor can for example be arranged, in particular directly, on a crawler track or on a side plate of the milling drum case or on another ground glide. When arranging the ground contact element, it is firstly essential that it is arranged on an element which should be mounted so as to be adjustable relative to the machine frame in terms of height and tilt in the longitudinal direction or working direction of the ground milling machine, in accordance with the ground condition. For this purpose, usually in ground milling machines crawler tracks are, for example, connected to the lower end of the lifting device, for example by means of a suitable bracket, via a suitable joint device. Side plates of the milling drum case are usually likewise mounted so as to be adjustable in height and simultaneously about an axis running in parallel with the milling drum, and are carried along in a floating manner during milling operation. On the other hand, at least in milling mode, the ground contact element should be in contact, in particular direct contact, with the subgrade and be carried along with the rest of the machine at least when in milling mode, or should move together with the rest of the machine in the working direction during working mode.

It is advantageous if at least two ground-contact-element tilt sensors are present, arranged on a respective ground contact element that is adjustable relative to the machine frame, said two ground contact elements being arranged ideally on two sides of the ground milling machine that are opposite one another in relation to the horizontal longitudinal central axis of the ground milling machine. This development according to the invention is advantageous in that it is then possible to react on an individual basis to single tilt changes of each of the two rear traction devices, or said changes can be taken into account by the control unit. This may be relevant in particular when the two rear traction devices run on different ground planes. In principle, side plates arranged on the two opposite end faces of the milling drum case can be used for this purpose, for example. Preferably, however, the ground milling machine has two rear traction devices, each connected to the machine frame by a respective lifting device, each of the rear traction devices comprising a ground-contact-element tilt sensor connected to the control unit. The at least one rear traction device is pivotable relative to the machine frame around a pivot joint about a horizontal pivot axis running transversely to the working direction. In particular, the at least one rear traction device can be a crawler track.

As already explained in relation to the method according to the invention, it may be advantageous if the ground milling machine has at least one further sensor for detecting an operating parameter and/or at least one operator input of the ground milling machine. By way of example, the sensor can be an operation sensor of the drive motor of the ground milling machine, said sensor determining the current speed or the current power output or the current operating status of the drive motor. Additionally or alternatively, an operation sensor of a hydraulic motor and/or a hydraulic pump can be provided, said sensor determining the current delivery rate or the current speed of the hydraulic motor and/or hydraulic pump. Additionally or alternatively, a speed sensor may also be comprised, which determines whether the milling drum is currently rotating and/or the current speed level of the milling drum. Furthermore, a travel sensor can be provided, which determines the distance covered by one of the traction devices per unit of time. Furthermore, the control unit can also take account of operator inputs, in particular manual inputs, for example the manual actuation of the vertical adjustment of one or more lifting devices. To determine a relative vertical adjustment and/or an absolute lifting position of the height-adjustable lifting device, a lift path sensor can be provided, which is configured to determine the current lifting position of the lifting device (a cable sensor, a capacitive travel sensor, etc.). It may also be advantageous if the ground milling machine comprises, in addition to the frame tilt sensor and the ground-contact-element tilt sensor, a transverse-tilt sensor, which determines the tilt of the machine frame in relation to a horizontal reference plane transverse to the working direction, and thus perpendicularly to the frame tilt sensor (or longitudinal-tilt sensor of the machine frame). This enables the additional sending and monitoring of the transverse-tilt position of the ground milling machine. It is also possible to combine the transverse-tilt sensor and the frame tilt sensor in a common position sensor. Regardless of the above-described sensors for determining and monitoring internal operating parameters of the ground milling machine, external operating parameters such as those regarding the current external operating environment can also be monitored. This may be, for example, a ground condition sensor, in particular a laser scanner or a camera, in particular for the spatial detection of the ground condition, by means of which the profile of the ground surface can be determined. This can be used in particular to detect milling edges and/or ground obstacles and for use by the control unit for control purposes. Preferred arrangement sites of a ground condition sensor of this kind are, for example, in front of the front traction devices in the working direction and/or in front of the milling drum in the working direction and/or behind the milling drum in the working direction between the milling drum and the rear traction devices and/or behind the rear traction devices in the working direction or on the machine rear.

For the control unit to be able to take account of the data determined by the above-described sensors, this sensor/these sensors is/are connected to the control unit in order to send the data determined by it/them by means of a data line. This can be done by means of corresponding cables but also wirelessly, preferably by means of a suitable BUS system. According to the invention, the control unit is then configured so as to control the height adjustment of the at least one rear height-adjustable lifting device at least in part by also taking account of the data of said at least one sensor.

Preferably, the control unit is configured to comprise or carry out a plausibility check in such a way as to distinguish between tilt changes associated with the milling process and tilt changes not associated with the milling process. In this regard, reference is made to the corresponding statements on the method according to the invention. The control unit is thus configured to perform this plausibility check function.

In a further preferred development, the control unit has threshold-based tipping monitoring. In this regard too, reference is made to the corresponding statements on the method according to the invention.

BRIEF DESCRIPTION OF THE DRAWINGS

The invention will be explained in more detail on the basis of the embodiment examples indicated in the schematic drawings, in which:

FIGS. 2-13 illustrate a workflow at the start of milling, during milling and when travelling over an obstacle/ending the milling operation, the individual figures specifically showing the following operating scenarios:

FIG. 2: the ground milling machine in transport mode;
FIG. 3: the ground milling machine in the zero position;
FIG. 4: the ground milling machine during ingress of the milling drum into the subgrade;
FIG. 5: the ground milling machine in the starting position at the desired milling depth;
FIG. 6: the ground milling machine once the milling operation has started up to the point at which the rear traction devices reach the ingress milling edge;
FIG. 7: the ground milling machine with the rear traction devices travelling over the ingress milling edge;
FIG. 8: the ground milling machine in milling mode with the rear traction devices in the milling bed oriented in parallel with the subgrade, in front of a ground obstacle following ingress of the milling drum into the subgrade;

FIG. 9: the ground milling machine in front of the ground obstacle with the milling drum raised;

FIG. 10: the ground milling machine from FIG. 9 with the machine frame oriented in parallel with the subgrade;

FIG. 11: the ground milling machine from FIG. 10 with the rear traction devices having reached the exit milling edge;

FIG. 12: the ground milling machine from FIG. 11 with the rear traction devices travelling over the exit milling edge; and FIG. 13: the ground milling machine in the transport mode according to FIG. 2.

FIGS. 18-20 illustrate a workflow at the start of milling, the individual figures specifically showing the following operating scenarios:

FIG. 18: the ground milling machine in transport mode;

FIG. 19: the ground milling machine from FIG. 18 with its rear region lowered to the desired milling depth;

FIG. 20: the ground milling machine from FIG. 19 with a tracking front region;

FIGS. 21A-21E: are overviews of tilt data (FIGS. 21A and B), stroke positions (of the lifting devices of the front traction devices in FIG. 21C and the lifting devices of the rear traction devices in FIG. 21D) and travel speed (FIG. 21E);

FIG. 22: a ground milling machine in the zero position;

FIG. 23: the ground milling machine from FIG. 22 at the start of an ingress process;

FIG. 24: the ground milling machine from FIG. 23 in a position lowered in parallel compared with FIG. 23;

FIG. 25: the ground milling machine from FIG. 24 in the starting position at a desired milling depth.

DETAILED DESCRIPTION

Figure 1:
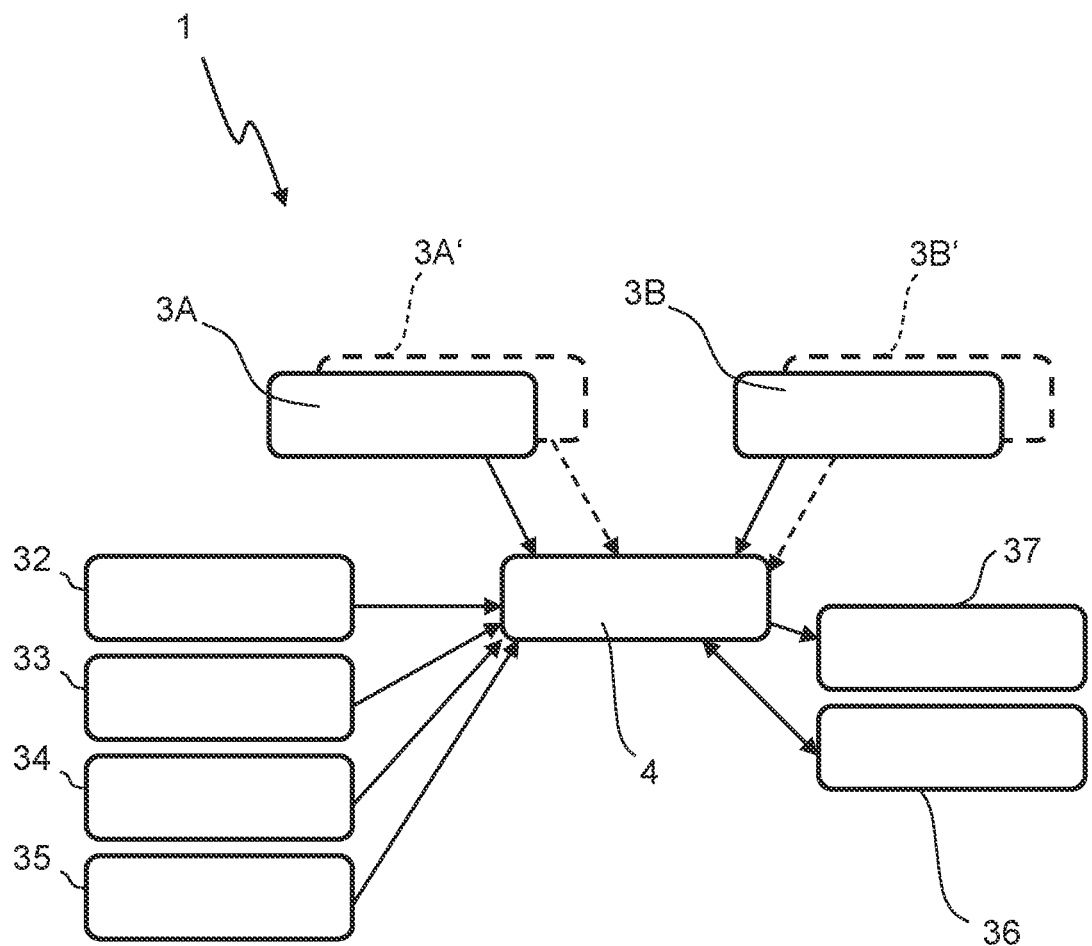
FIG. 1 is a flow diagram of a method according to the invention.

Like components or those with identical functions can be indicated in the drawings by like reference numerals. Not every component appearing multiple times in the drawings is necessarily highlighted separately in each figure.

FIG. 1 firstly illustrates the sequence of a method 1 according to the invention. FIG. 2 to 13 illustrate individual method steps on the basis of a specific embodiment example of a ground milling machine 2 according to the invention. FIG. 16 illustrates the basic design and preferred developments of a control unit and a sensor system that are suitable for carrying out a method according to the invention.

An essential element of the method according to the invention for controlling the height adjustment of a height-adjustable running gear of a self-propelled ground milling machine is, in a first step 3A), determining and monitoring a tilt of a machine frame and/or a change in the tilt of the machine frame in the working direction of the ground milling machine, i.e. a longitudinal tilt of the machine frame, and determining and monitoring a tilt of the ground contact element and/or a change in the tilt of the ground contact element in the working direction.

First and foremost, it is essential that the tilt is based on a reference line of the machine frame running in the working direction of the ground milling machine, typically in the forward direction. This can be defined, for example, by the axis of the maximum longitudinal extent of the machine frame and/or the entire ground milling machine in the working direction when in a starting position. It can also be predefined more or less arbitrarily. It is essential that said virtual reference line has an extent in the working or forward direction of the machine. The tilt indicates the angular offset of said reference line from a horizontal reference plane, for example defined by the gravitational field of the Earth or by an instrument horizon. In the process, the tilt of the machine frame can be determined as either an absolute degrees value or, on the basis of a predefined starting tilt, a change in the current tilt relative to the starting tilt. The tilt of the ground contact element is determined and monitored in the same way; in this case, a reference line running in the working direction or forward direction of the ground milling machine is defined as a reference, for example again as the maximum longitudinal extent of the ground contact element in the working direction in a starting position.

Additionally or alternatively, it can also be provided that, in an alternative first step 3B), the determination and monitoring of a tilt difference between the tilt of the machine frame and/or a change in the tilt of the machine frame in the working direction, and a tilt of the ground contact element and/or a change in the tilt of the ground contact element in the working direction are provided, for example in each case based on a reference line as described above. In this alternative method approach, therefore, the relative change of the tilts of the machine frame and the ground contact element is determined and monitored. On the basis of, or depending on, the tilt data carried out in steps 3A and/or 3B and/or changes in the tilt data, in a further step 4 a vertical adjustment of the lifting device of the at least one rear traction device is then controlled by a control unit. This is done by counteracting the tilt change of the machine frame towards a starting tilt, for example the horizontal position, for example predefined manually by the driver.

Steps 3A and/or 3B can be carried out alternately or simultaneously at other sites, for example at further positions and/or at further ground contact elements, as indicated in FIG. 1 by steps 3A' and 3B'.

Figure 2:
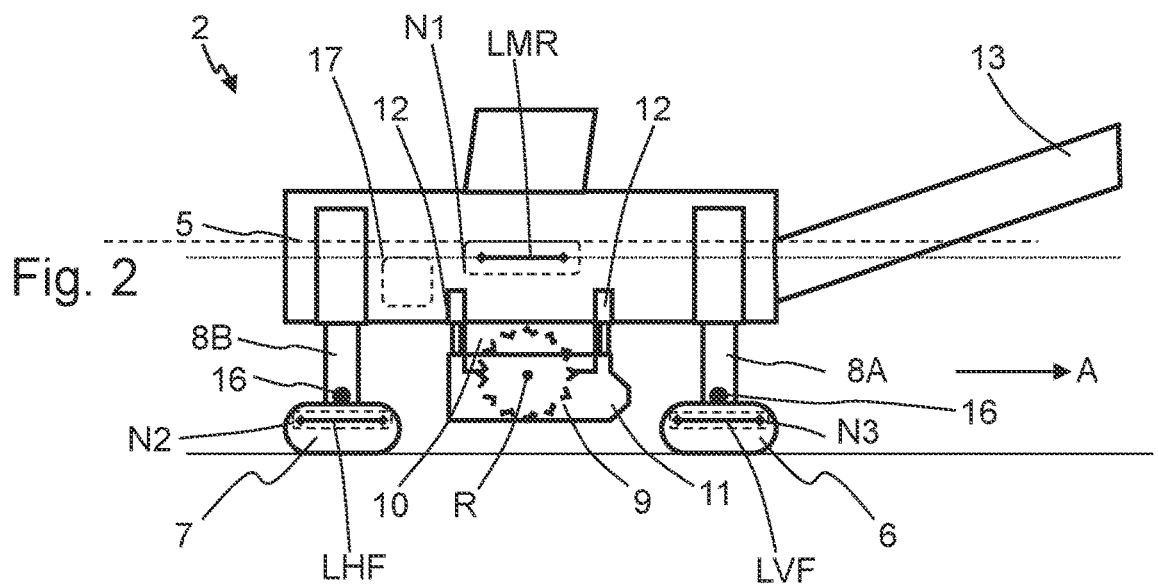

The above-described basic principle of the method according to the invention is explained in more detail in FIG. 2 to 13. The ground milling machine 2 shown therein comprises a machine frame 5, which stands on the subgrade by means of front traction devices 6 (in the side views of FIG. 2 to 13, only the front right-hand traction device 6 is visible; the other front left-hand traction device is located therebehind in the image plane) and by means of rear traction devices 7 (in the side views of FIG. 2 to 13, only the rear right-hand traction device 7 is visible; the further rear left-hand traction device is located therebehind in the image plane). The traction devices 6, 7 are each connected to the machine frame 5 by means of a respective lifting device 8A, 8B. The lifting devices 8A, 8B can, for example, be vertically adjustable lifting columns, as described in the prior art for generic ground milling machines. By adjusting the height of the lifting devices 8A, 8B, the height position of the machine frame 5 can thus be varied relative to the subgrade in terms of stroke height and tilt. It is also possible that only some of the traction devices, for example in particular the rear traction devices, are connected to the machine frame in a height-adjustable manner by means of lifting devices. The other traction devices, in particular, for example, the front traction devices, can be connected to the machine frame rigidly or so as to be adjustable to a limited extent, for example by means of a swing axle. The ground milling machine 2 further comprises a milling drum 9, which is arranged inside a milling drum case 10 and mounted thereby to the machine frame 5. The milling drum 9 indicated merely schematically in the drawings can in particular be a substantially hollow-cylinder carrier tube, on the outer casing of which a plurality of milling tools are arranged, protruding in the radial direction. In the working or milling mode, the milling drum 9 rotates about a horizontal axis of rotation R running transversely to the working direction A. On both end faces of the milling drum 9, the milling drum case 10 comprises a side plate 11. The side plates 11 are used to seal the sides of the milling drum case 10 and are mounted so as to be height-adjustable with respect to the milling drum 9 and the machine frame 5 and on and relative to the milling drum case 10 and/or on the machine frame 5. They can be mounted, for example, by means of suitable guide devices or, as indicated in FIG. 2, by means of hydraulic cylinders 12. As shown in the current embodiment example, the milling drum 9 and the milling drum case 10 can be arranged between the front and rear traction devices 6 and 7 when viewed in the working direction A, in particular spaced apart from the front and rear traction devices when viewed in the working direction A. Arrangement in the rear region, for example between the two rear traction devices, is also possible. This is illustrated in more detail by way of example in FIG. 18 to 20. The ground milling machine 2 can further comprise a conveyor device 13 (in the drawings, an external conveyor belt known per se is shown by way of example as part of the conveyor device 13) for conveying away the milled-out milled matter. The external conveyor belt can be pivotable sideways about a vertical axis in relation to the machine frame 5 and/or pivotable vertically about a horizontal axis, in particular in relation to the ejection point of the external conveyor belt. The ground milling machine 2 is operated in particular via a control platform 14.

The traction devices 6 and 7 are preferably crawler tracks. They may be a supporting frame, a drive, etc., in a manner known per se in the prior art. The traction devices are formed so as to be elongated in the working direction A, and thus preferably have a larger longitudinal extent in the working direction A than in the vertical direction. The traction devices 6 and 7 arranged on the lifting devices 8A and 8B in the lower region thereof are pivotable relative to the machine frame 5 about a horizontal pivot axis, which runs transversely to the working direction A and is for example formed by a pivot joint 16, in relation to the lifting devices, which are preferably height-adjustable in a linear manner.

The ground milling machine 1 further comprises a control unit 17 (shown by way of example only in FIG. 2 for FIG. 2 to 13). Said control unit controls the vertical adjustment in particular of the lifting devices 8B (rear lifting devices) and optionally also of the lifting devices 8A (front lifting devices) depending on tilt data determined by means of sensors and sent to the control unit 17, specifically longitudinal-tilt data in the working direction A of the machine frame 5 and of at least one of the rear traction devices 7. In this regard, FIG. 2 to 13 show the longitudinal tilt LMR of the machine frame 5 and the longitudinal tilt LHF of one of the rear traction devices 7, and the longitudinal tilt LVF of one of the front traction devices 6, in each case relative to a horizontal and/or defined reference line in the working direction A. The tilts LMR, LHF and LVF are thus each based on a reference straight line related to the machine frame (LMR) and the relevant traction devices 6, 7 (LHF and LVF) and extending in the working direction A. The course of this reference straight line in the working direction A is indicated, where relevant, by a dotted line in FIG. 2 to 13. The tilt change of the longitudinal tilt of the machine frame (or of the reference straight line defined thereon in the longitudinal direction) and of the rear traction device (or of the reference straight line defined thereon in the longitudinal direction) relative to a respective reference line (indicated where relevant in the drawings by a dashed line), for example a reference line parallel to the longitudinal extent of the subgrade, a horizontal and/or a defined reference line (all three lines being identical in the embodiment example), the control unit 17 is ultimately used to control at least one of the above-described lifting devices. It is thus essential that the reference straight line can change depending on the position of the machine and/or parts thereof, whereas the reference line is determined by factors external to the machine, such as a horizontal or the ground surface. In this embodiment example, the tilt is thus determined in a virtual vertical plane in the working direction of the machine from the angle W between the relevant reference straight line and the reference line, which is for example horizontal and/or runs in parallel with the longitudinal extent of the subgrade, in each case longitudinally in the working direction A. To determine said longitudinal tilts LMR and LHF, tilt sensors N1 and N2 are arranged in each case at least on the machine frame 5 and on at least one of the rear traction devices 7 (indicated schematically by way of example only in FIG. 2). Furthermore, an additional tilt sensor N3 can be provided on one or more of the front traction devices 6 in order to determine the tilt LVF. It is also possible to provide further tilt sensors N1 (for example on different sides of the machine frame) and N2 (for example on the two rear traction devices). The tilt data determined by said tilt sensors N1 to N3, where present, are sent to the control unit 17 by means of suitable signal transmission connections.

FIG. 2 shows the ground milling machine 2 in the transport mode. In this embodiment example, for this purpose the lifting devices 8A and 8B are extended such that the milling drum 9 and the side plates 11 are not engaged with the subgrade. The longitudinal extent of the machine frame 5 and of the traction devices 6 and 7 thus extends in parallel with the subgrade (as an example of the reference line). The tilts LMR, LHF and LVF are 0 and the respective tilt angles W are 0. Each reference straight line is running in parallel with the reference line(s).

Figure 3:
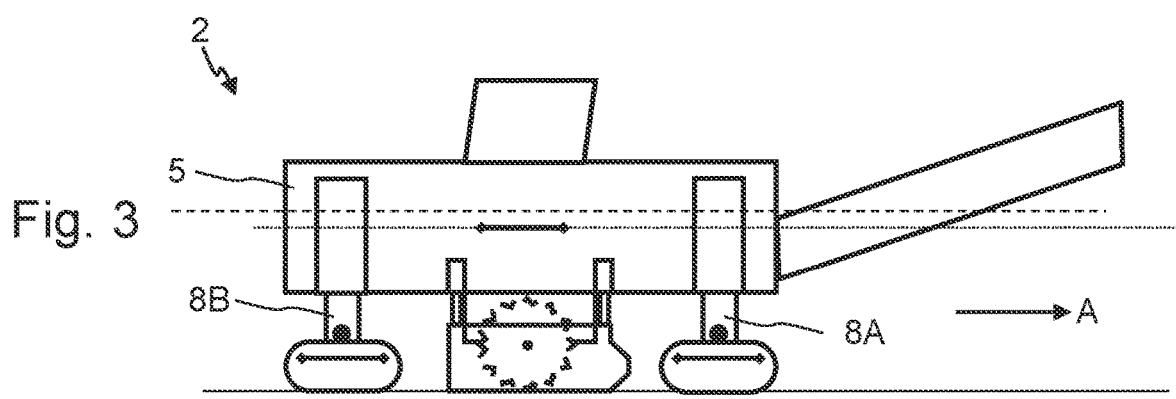

In FIG. 3, the lifting devices 8A and 8B are retracted in order to lower the machine frame 5. This procedure is continued until the milling drum 9 "scratches" the subgrade. To reach the position in FIG. 3 starting from the position shown in FIG. 2, the lifting devices 8A and 8B can be retracted either simultaneously or one after the other. Furthermore, this can be done manually or also in an automatically controlled manner. The position of the ground milling machine 2 shown in FIG. 3 is also referred to as the zero position in the present case. The zero position thus denotes the position of the ground milling machine 2 in which it has assumed its reference starting position and also the milling drum 9 is standing on the as yet unmilled working surface.

By way of example, it is thus also possible for the driver of the ground milling machine 2 to define this relative position of the machine frame, set manually for example, as the zero position for the control unit 17.

Figure 4:
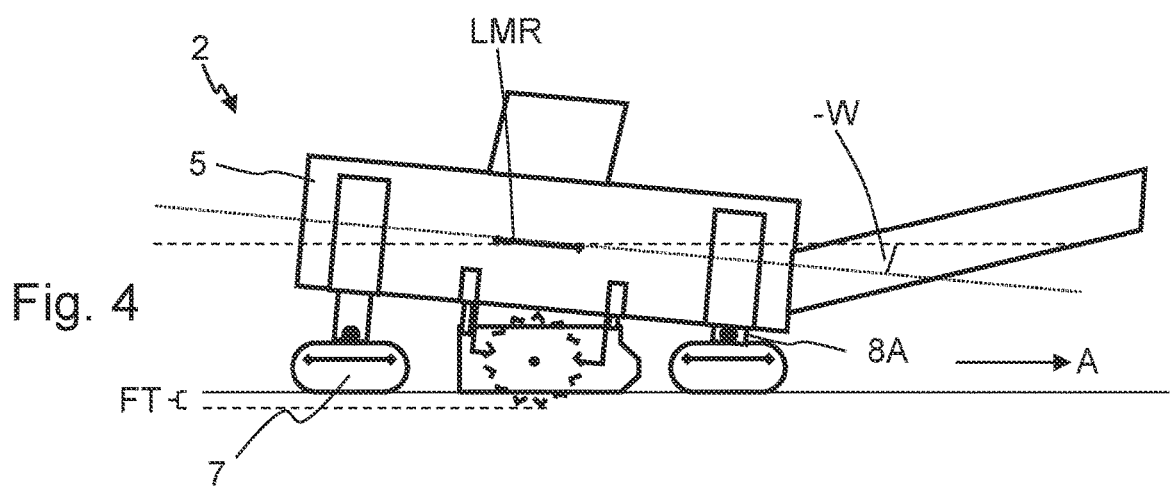

FIG. 4 now shows the beginning of the ingress process, in which the milling drum 9 is lowered into the subgrade. The current milling depth FT refers to the ingress depth of the milling drum 9 in relation to the unmilled subgrade perpendicularly to the plane of the unmilled ground surface. From the position shown in FIG. 3 to that shown in FIG. 4, only the lifting devices 8A of the front traction devices 6 have been retracted further. The machine frame 5 thus assumes a tilt angle or an LMR of −W in relation to the reference horizontal, whereas the traction devices 7 and 8 (and also the side plate 11) are still running in parallel with the horizontal (LHF and LVF are 0).

Figure 5:
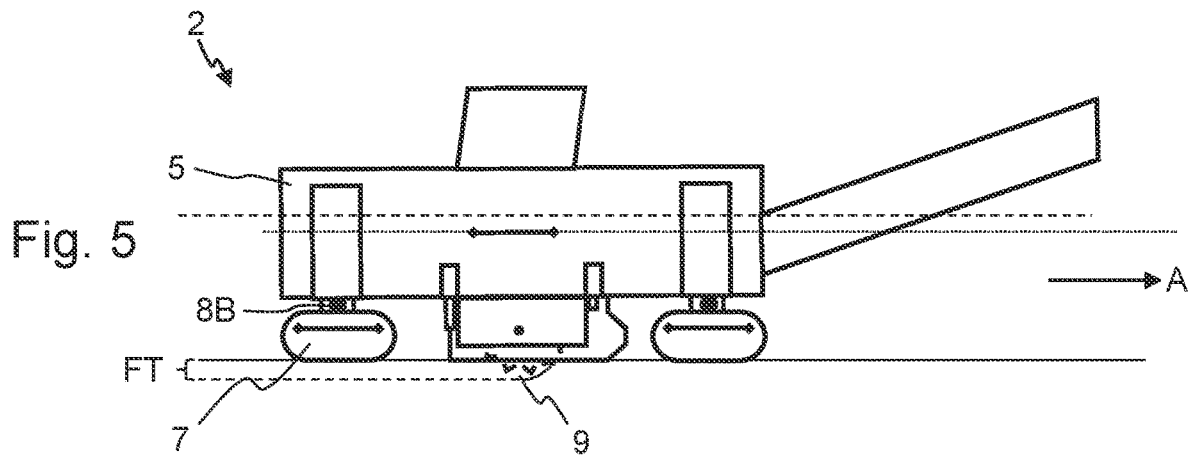

The ingress operation is continued further from the position shown in FIG. 4 to that shown in FIG. 5. In FIG. 4, the front lifting devices 8A have assumed their final retraction position. From there, the rear lifting devices 8B are then also retracted as far as to the final position indicated in FIG. 5, in which the machine frame 5 is again oriented in parallel with the horizontal (LMR=0) and thus has no longitudinal tilt. With the milling drum 9, the ground milling machine 2 goes down into the subgrade to the ultimately desired milling depth FT.

It is also possible to lower the machine frame 5 from FIG. 3 to FIG. 5 concurrently by retracting all the lifting devices substantially simultaneously.

Figure 6:
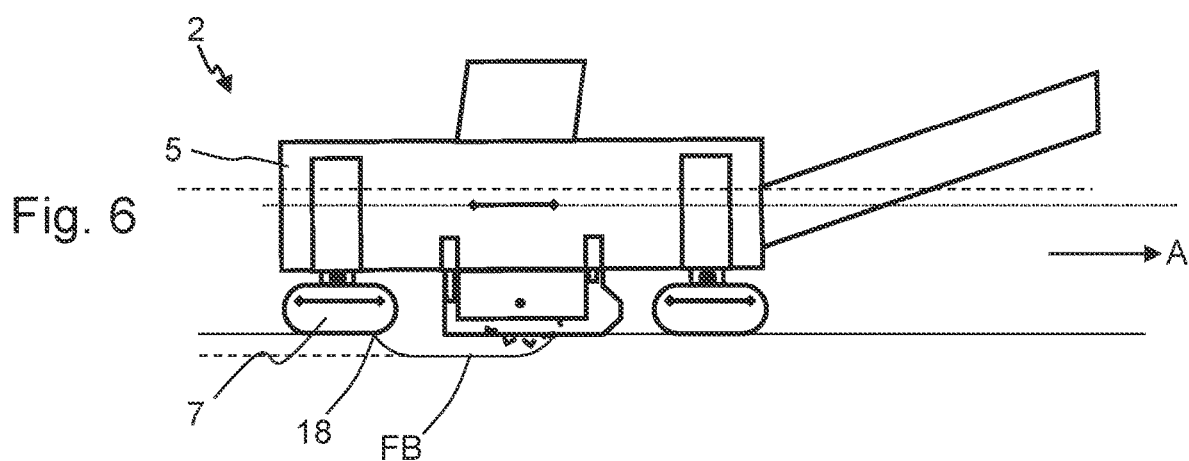

In the sequence shown in FIG. 2 to 5, the ground milling machine 2 has not yet moved forwards in the working direction A. The adjustments that have taken place were rather solely in the vertical direction as a result of adjustment movements of the lifting devices 8A and 8B. From the position shown in FIG. 5, the ground milling machine 2 starts a forward movement in the working direction A, whereby the milling bed FB is generated in the subgrade, as shown in FIG. 6. The start of the milling bed FB is the ingress milling edge 18. The rear traction devices 7 initially travel at the height of the unmilled subgrade and approach the ingress milling edge 18 in the working direction A.

Once the ground milling machine 2 has covered, in the working direction A, substantially the distance corresponding to the spacing between the milling drum 9 and the rear traction devices 7 in the working direction A, the rear traction devices 7 pass over the ingress milling edge 18. As a result, the rear traction devices 7 rotate about the pivot joint 16 and assume a negative longitudinal-tilt angle of −Y when viewed in the working direction A. At the same time, the rear end of the machine frame 5 drops down, such that the longitudinal tilt LMR of the machine frame 5 has a longitudinal-tilt angle of +W. In magnitude terms, Y is greater than W. The tilt of the front traction devices, which run constantly on the unmilled subgrade, always remains unchanged, however.

The changes in the longitudinal tilts LHF and LMR are sent to the control unit 17. On the basis of the above-described changes to the longitudinal tilts LMR and LHF or the change thereof over time and/or according to the distance travelled, the control unit ascertains that the rear traction devices are travelling into the milling bed FB and initiates an extension of the rear lifting devices 8B in order to compensate for the position change of the machine frame 5, until such a point as the machine frame 5 has a longitudinal tilt LMR that corresponds to the zero position according to FIG. 5. The rear lifting devices 8B cannot be extended when the rear traction devices 7 are standing horizontally in the milling bed FB, as shown in FIG. 8. FIG. 8 illustrates that, in this operating scenario, the longitudinal tilts LMR, LVF and LHF of the front and rear traction devices and of the machine frame 5 are parallel to one another, and overall parallel to the horizontal. As a result of a controlled extension of the rear lifting devices by means of the control unit 17, the ground milling machine 2 has thus been brought into a position that is parallel to the horizontal in terms of the longitudinal tilt of the machine frame and/or a substantially identical position to the start of the milling process (FIG. 5) in terms of the vertical position relative to the unmilled subgrade. It goes without saying that this process can run in a controlled manner and concurrently with the travelling of the rear traction devices into the milling bed, as soon as the control unit has ascertained that the milling edge 18 has been travelled over on the basis of the tilt changes that occur at the start. Additionally or alternatively, this can also be done purely on the basis of the distance travelled, for example.

Turning to FIG. 8, the milling operation is now continued further, and the machine is now, for example, moving towards a ground obstacle 19, such as a manhole cover, in the subgrade (or also the end of the milling track). To prevent the milling drum 9 being damaged by this ground obstacle, the milling drum has to be raised over the ground obstacle 19 in the working direction A. To do so, the ground milling machine ideally approaches the ground obstacle 19 at the milling depth FT until such a point as the milling drum engages with the subgrade just in front of the ground obstacle when viewed in the working direction A. The ground milling machine 2 is then stopped and the driver of the ground milling machine can, for example, raise the milling drum 9 out of the subgrade by extending the front lifting devices 8A. In the milling bed FB, there is thus an egress milling edge 20. As a result of the extension movement of the front lifting devices 8A, the machine frame 5 assumes a longitudinal tilt of +W while the ground milling machine 2 is stationary (FIG. 9). This tilt change of the longitudinal tilt LMR is sent to the control unit 17 by means of the tilt sensor of the machine frame, and the control unit then triggers an extension movement of the rear lifting devices 8B that compensates for said longitudinal-tilt change LMR. This is done until the machine frame 5 is oriented in parallel with the horizontal again in terms of its longitudinal tilt, as shown in FIG. 10. In the range from FIG. 8 to 10, the ground milling machine 1 does not move in the working direction A.

Figure 11:
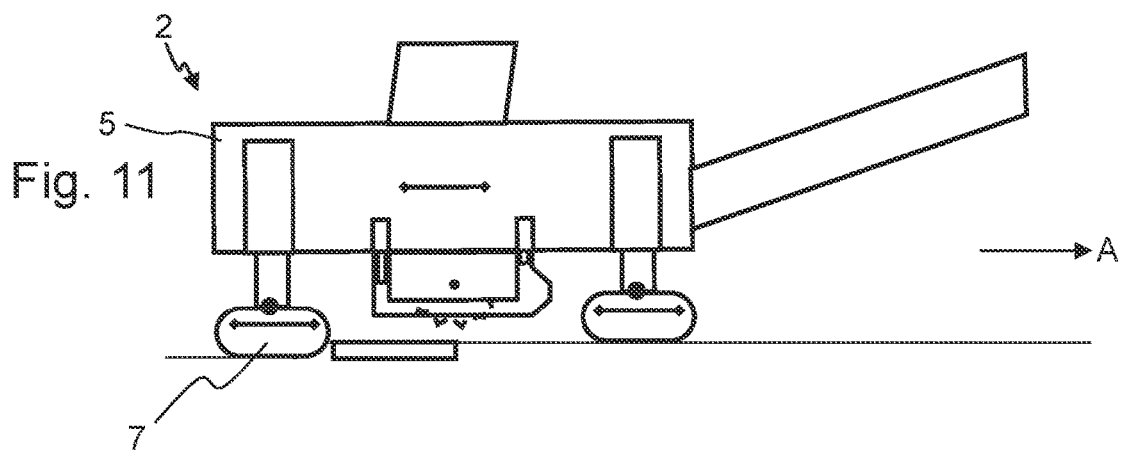

Once the position according to FIG. 10 has been reached, the ground milling machine 2 moves further in the working direction A until the rear traction devices, which until now have been travelling in the milling bed FB, are brought close to the egress milling edge 20 (FIG. 11). As the ground milling machine 2 continues to move in the working direction A, the rear traction devices have to travel over said egress milling edge 20, and thus pivot upwards, by their front peaks, such that the longitudinal tilt LHF of the rear traction devices changes to the value +Y and the longitudinal tilt LMR of the machine frame changes to the value −W, the value Y being greater than the value W in terms of magnitude. The changes in the longitudinal tilts LMR and LHF determined by sensors are determined by means of suitable signal lines to the control unit 17, which counteracts the tilt change LMR of the machine frame 5 by retracting the rear lifting devices 8B until the longitudinal tilt of the machine frame corresponds once again to the tilt of the machine frame in the zero position. The ground milling machine can now travel over the ground obstacle 18 in a manner oriented in parallel with the subgrade (FIG. 13), and the milling drum can go back down into the ground, for example, downstream of the ground obstacle or the like.

Figure 12:
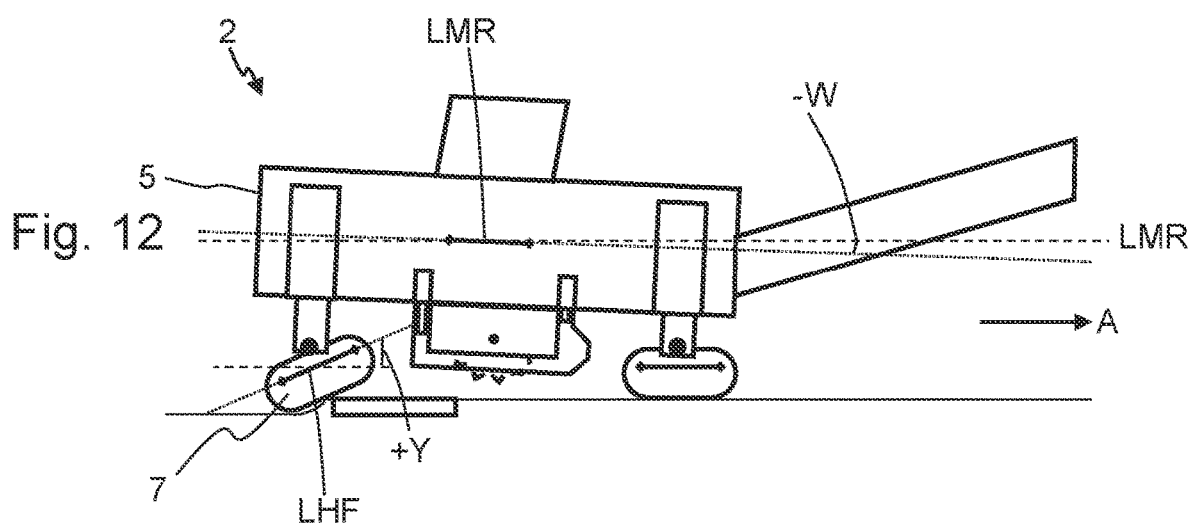
Figure 13:
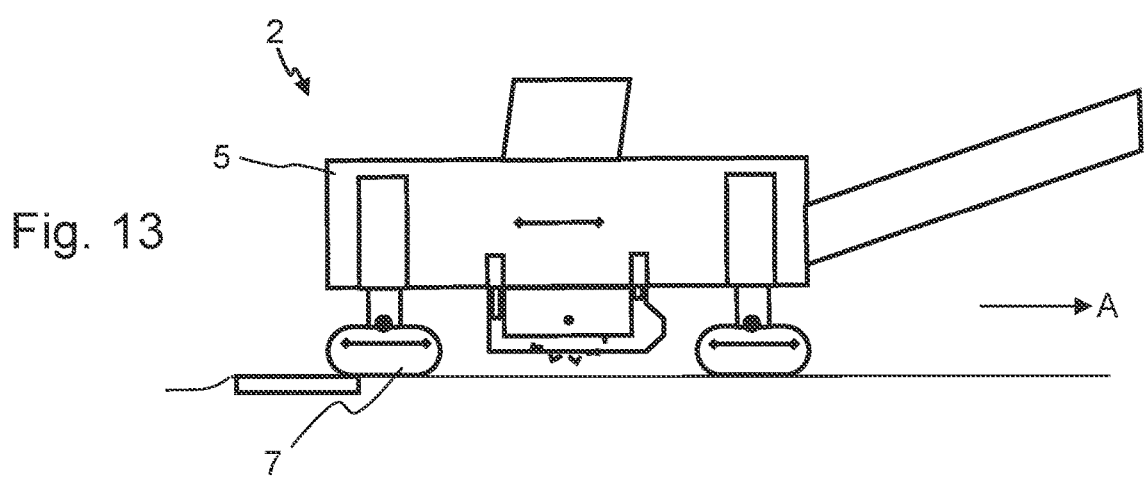
Figure 14:
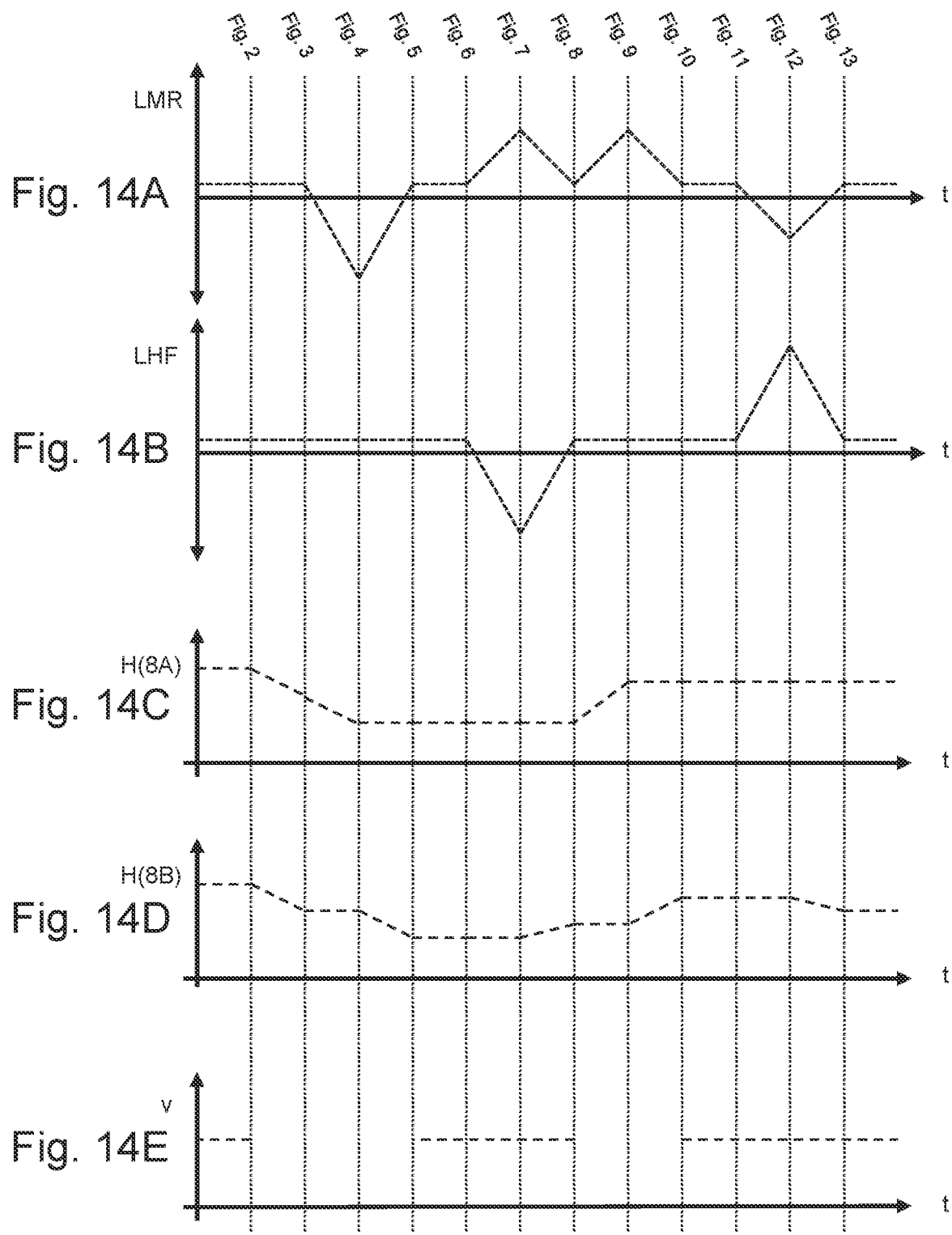
FIGS. 14A-14E: are overviews of tilt data (FIG. 14A LMR, FIG. 14B LHF), stroke positions (of the lifting devices of the front traction devices in FIG. 14C and the lifting devices of the rear traction devices in FIG. 14D) and travel speed (FIG. 14E)

FIG. 14 now shows various parameter curves over time in relation to FIG. 2 to 13, these curves illustrating the control behavior of the control unit 17 in more detail. The specific operating scenarios shown are the lowering and ingress of the milling drum at the start of milling, the travelling of the rear traction devices over the milling edge, and the raising of the milling drum out of the subgrade. These are only example operating scenarios for illustrating the mode of operation of the invention and should not be considered to be definitive in any way. By way of example, further operating scenarios can in particular also be the travelling loading or unloading of the ground milling machine onto/off a transportation vehicle, the transportation of the machine between different deployment sites over obstacles, etc.

FIG. 14A illustrates the longitudinal-tilt curve LMR of the machine frame 5. In the ingress phase, the machine frame initially tips forwards in the working direction since, in the embodiment example shown, the front lifting devices 8A are retracted first for the purpose of the ingress. In particular, the tilt curve from FIG. 3 to 5 can also, for example, have an alternative shape if the front and lifting devices 8A and 8B are retracted concurrently and simultaneously. The same applies in principle to the raising of the milling drum (FIG. 8 to 10), which, for example, can likewise be achieved alternatively by adjusting the front and rear lifting devices 8A and 8B concurrently. In that case, there would be no significant change in the longitudinal tilt of the machine frame 5 over time over FIG. 3 to 5 and/or FIG. 8 to 10. Of particular note are the tilt curves LMR of the machine frame 5 in the phases in which the rear traction devices 7 are travelling over the ingress milling edge 18 (FIG. 6 to 8) and the egress milling edge 20 (FIG. 11 to 13). When travelling over the ingress milling edge 18 (from FIG. 6 to 8), the longitudinal tilt LMR of the machine frame 5 jumps briefly, whereas when travelling over the egress milling edge 20 the longitudinal tilt LMR of the machine frame 5 drops briefly.

As compared with the longitudinal-tilt curve LMR of the machine frame 5, FIG. 14B shows the curve of the longitudinal tilt LHF of at least one or both of the rear traction devices 7. In this case, it should first be pointed out that the longitudinal tilts LHF change only when travelling over the ingress milling edge 18 (FIG. 6 to 8) and the egress milling edge 20 (FIG. 11 to 13). In the process, the longitudinal tilts LHF run in the opposite direction to the longitudinal tilt LMR of the machine frame 5. This curve scenario is characteristic of travelling over one of the milling edges 18, 20, and can be used by the control unit 17 to identify an operating scenario of this kind.

FIG. 14C shows the position of the front lifting devices 8A (stroke height H(8A)) and FIG. 14D shows the position of the rear lifting devices 8B (stroke height H(8B)). These are based on the positional or extension height of each lifting device, respectively. It has already been mentioned above that, in principle, many different possible variants exist in this case. For example, the lifting devices 8A and 8B can take place by substantially simultaneously adjusting the two lifting devices concurrently over the time period shown in FIG. 2 to 5, in which the milling drum is lowered from the transportation position to its ultimate milling depth. It is now important that the control is carried out to ensure the machine frame is parallel to the subgrade or to a starting zero position of the machine frame by actuating the stroke position of the rear lifting devices 8B, as can be seen in FIG. 14D in the period from FIG. 7 to FIG. 8 and from FIG. 12 to FIG. 13. By extending (FIG. 7 to FIG. 8) and retracting (FIG. 12 to FIG. 13) the rear lifting devices 8B, the control unit 17 thus compensates for the change in the longitudinal tilt LMR of the machine frame 5 in a controlled manner until the machine frame has resumed its starting longitudinal tilt LMR or its zero position.

As a precautionary measure, FIG. 14E illustrates the operating phases in which the ground milling machine 2 is moving or stationary in the working direction A during the workflow shown in FIG. 2 to 13. Specifically, stationary phases are found, for example, in FIG. 2 to 5 and FIG. 8 to 10, i.e. whenever the milling drum is lowered into the subgrade or raised out of it. It goes without saying that in this respect possible variants in relation to the specific travel speed are possible and corresponding acceleration and braking phases are necessary. In this context, however, FIG. 14E merely basically shows when the ground milling machine 2 is moving in the working direction 2 and when it is not. FIG. 14E thus illustrates that the change in the longitudinal tilt LMR of the machine frame 5 when travelling over the milling edges 18 and 20 can be compensated for during ongoing travel.

It goes without saying that to identify when the milling edges 18 and 20 are being travelled over in the operating phases from FIG. 6 to 8 and FIG. 11 to 13, thresholds can be predefined by and/or in the control unit 17, in particular in terms of the change in the longitudinal tilts LMR and/or LHF that is required in order to trigger the compensating. As a result, the control unit 17 does not trigger corresponding compensation measures upon every minimal longitudinal-tilt change.

Additionally or alternatively, a plausibility check can also be provided, in particular also by using further operating parameters of the ground milling machine 2. By way of example, the control unit 17 can be configured such as to query whether or not the ground milling machine 2 is currently moving in the working direction, in addition to evaluating the changes in the longitudinal tilts LMR and LHF. To travel over one of the milling edges 18 or 20, the ground milling machine must be moving at least in or counter to the working direction. Longitudinal-tilt changes when the machine is stationary therefore must be attributable to other circumstances.

FIG. 2 to 14 have already referred to the formation of the ground contact element as a rear traction device 7. Additionally or alternatively, reference can also be made in this respect to the longitudinal tilt of one of the side plates or a separate ground contact element. It is essential that the ground contact element runs at least in part in the milling bed or is guided over the milling edges 18 and 20, and that its longitudinal tilt is variable with respect to the machine frame 5.

Figure 7:
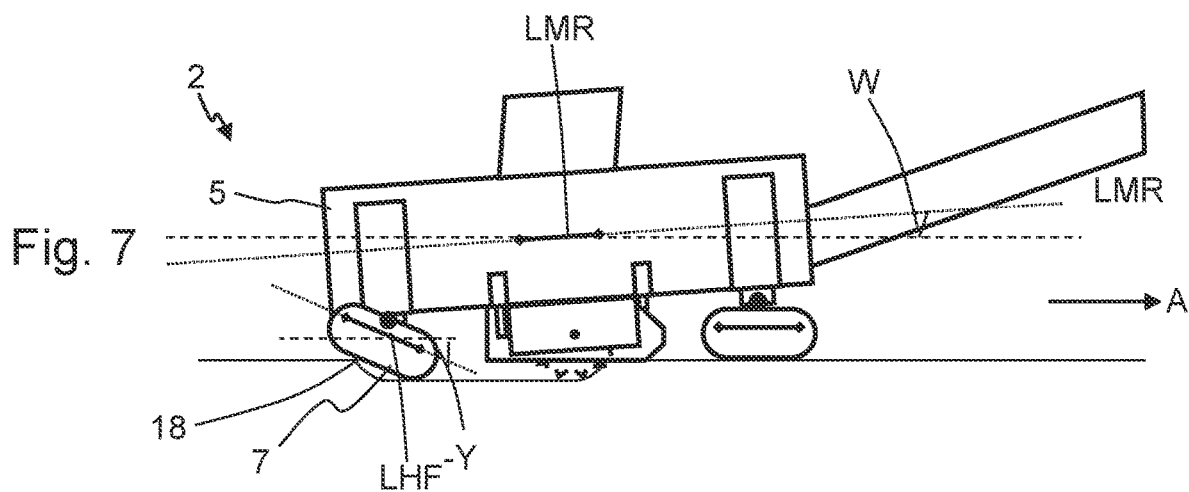
Figure 15:
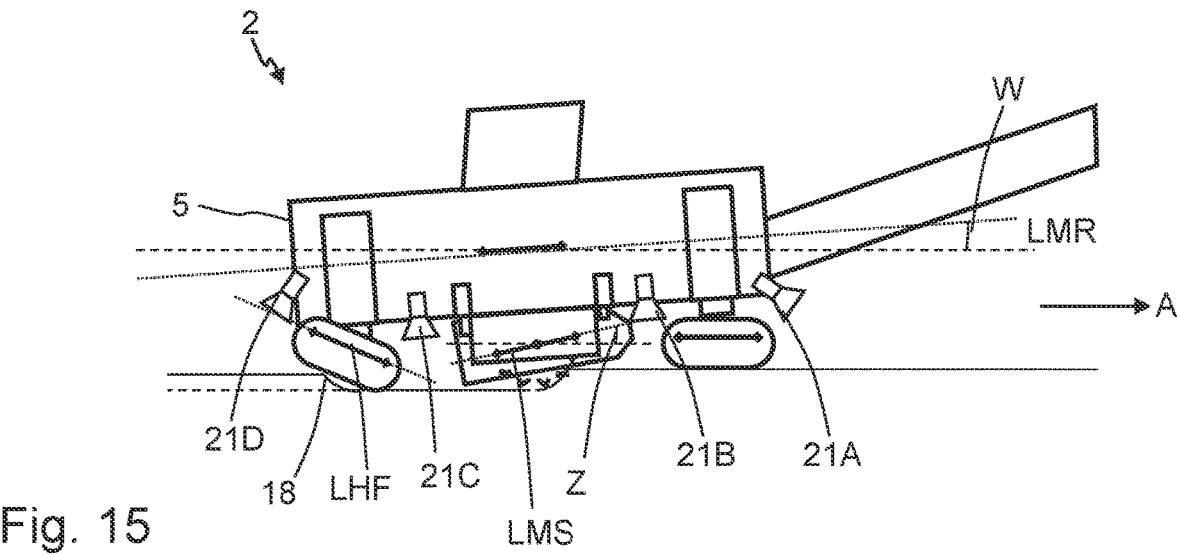
FIG. 15: illustrates a ground milling machine in an alternative embodiment.

FIG. 15 now shows an alternative embodiment of a ground milling machine 2, specifically in an operating scenario corresponding substantially to that in FIG. 7. For the embodiment in FIG. 15, reference is made substantially to the particular features and to the differences from the preceding ground milling machine 2 according to FIG. 2 to 13. Otherwise, reference is made to the above statements for this machine too.

A particular feature of the ground milling machine 2 in FIG. 15 compared with the previous variant is that it has a plurality of visual detection devices 21, in particular cameras 21A to 21D, which are pointed at the subgrade and can be provided additionally or alternatively with respect to one another. The camera 21A records the ground region located in front of the front traction devices in the working direction A. By contrast, the camera 21B records the ground region located between the front traction devices and the milling drum case 10 in the working direction A. The camera 21C records the ground region located between the rear traction devices and the milling drum case 10 in the working direction A. Lastly, the camera 21D records the ground region located in particular immediately behind the rear traction devices 7 in the working direction A. The cameras 21A to 21D can be used additionally or alternatively to one another, in particular for the plausibility check by the control unit, in order to ensure, for example, that tilt changes in the longitudinal tilts LMR and/or LHF and/or LVF can be attributed to changes in the ground conditions, for example travelling over a milling edge, and not other factors. This can be done in particular also with the help of image-processing software functions of the control unit 17, for example for identifying height changes in the ground region.

By way of example, in the embodiment example according to FIG. 15 a longitudinal-tilt sensor is further provided on the side plate 11, said sensor determining a longitudinal tilt LMS of a side plate 11 and transmitting it to the control unit 17. The longitudinal-tilt data LMS can, for example, be used additionally by the control unit 17 in order to identify particular operating scenarios more clearly, for example tilt changes of the machine frame triggered by a height adjustment of the lifting devices.

Figures 16A, 16B:
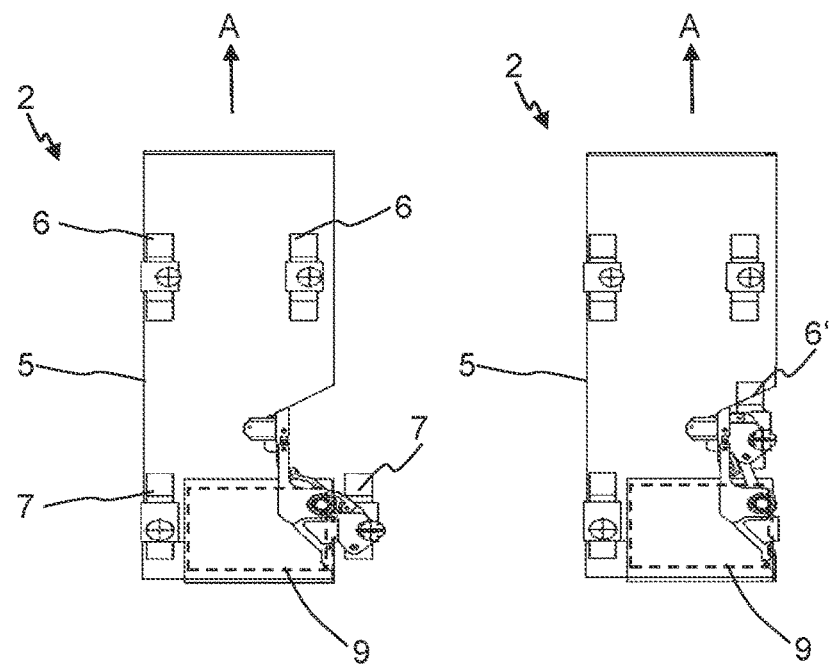
FIGS. 16A-16B: illustrates an alternative embodiment of a ground milling machine.

FIGS. 16A and 16B are plan views of a further alternative embodiment of a ground milling machine 2 in the form of a self-propelled rear-type miller. In this respect too, reference is substantially made to the previous statements for the mode of operation of the control procedure according to the invention. A particular feature of rear-rotor millers of this kind is that the milling drum 9 is arranged in the rear region of the machine between the two rear traction devices 7. In addition, at least one of the rear traction devices 7 is often adjustable between an exposed position (FIG. 16A) and a position in which it is pivoted in front of the milling drum in the working direction (FIG. 16B). The pivot position can also be detected by suitable sensors and taken into account by the control unit 17 in order to control the stroke position.

Figure 17:
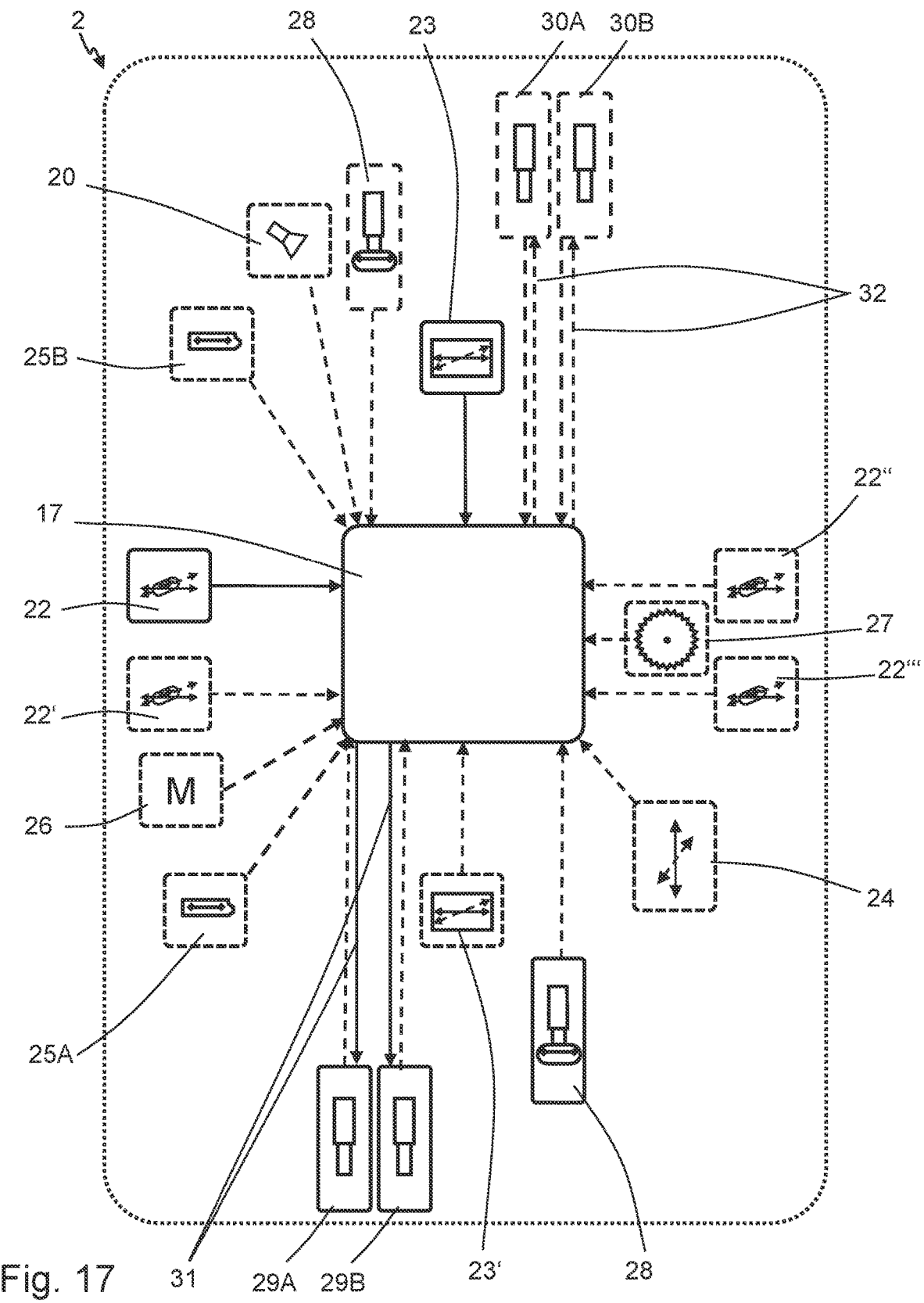
FIG. 17: is a schematic overview of the mode of operation of a control unit.

Lastly, FIG. 17 illustrates further details on the mode of operation of the control unit 17. Arrows pointing towards the control unit 17 denote information or signals that are supplied to the control unit 17. Arrows emanating from the control unit, on the other hand, denote control signals output by the control unit 17.

A sensor 22 delivers signals on the longitudinal tilt (LHF) of the at least one ground contact element, for example a rear crawler track, as described above. In principle, it may be sufficient to deliver only signals of a single ground contact element. However, it is also possible, for example if there are two rear traction devices, for one sensor 22 (22 and 22') (or N2 in FIG. 2) to deliver individual signals on the longitudinal tilt of each ground contact element for each of the rear traction devices. In this case, the control unit 17 can, for example, more accurately recognize when a milling edge 18, 20 is being travelled over and/or can switch between right-hand and/or left-hand tilt monitoring in special situations. This may be relevant, for example, when using milling drum segments that are shorter in terms of the axial extent, i.e. when, for example, just one of the rear traction devices is running in the milling bed while the other of the rear traction devices is running on the unmilled ground surface. Additionally or alternatively, a longitudinal-tilt sensor 22" and/or 22''' (or N3 in FIG. 2) can also be provided for at least one of the front traction devices for determining the longitudinal tilt (LVF) of at least one of the front traction devices. In this way, the control unit 17 can also recognize and take account of ground level changes, for example milling edges of previous milling processes, in front of the milling drum in the working direction A.

A further longitudinal-tilt sensor 23 (or N1 in FIG. 2) is arranged on the machine frame for determining the longitudinal tilt (LMR) of the machine frame. Said sensor delivers data on the current longitudinal tilt LMR of the machine frame in the working direction to the control unit 17. In this case too, said longitudinal-tilt sensor 23 can be arranged in a manner assigned to one of the machine sides instead of being arranged in the middle with respect to the machine width. In addition to a longitudinal-tilt sensor 23 of this kind assigned to one side of the ground milling machine 2, a further longitudinal-tilt sensor 23' can also be provided, for example assigned to the other side of the ground milling machine 2.

In addition to the above-described sensors, it is also possible to arrange at least one transverse-tilt sensor 24 on the machine frame, said sensor being configured to determine the tilt of the machine frame in relation to a horizontal plane transverse to the working direction. In this way, the control unit can additionally take account of the transverse tilt of the machine frame in order to control one or more lifting devices.

The additional use of optical ground-detection apparatuses, such as cameras 20 (specifically cameras 20A to 20D), has already been explained in relation to the embodiment example according to FIG. 15. These can also be connected to the control unit 17 for signal transmission.

Tilt data of one or more side plates can also be taken into account by the control unit 17. In this regard, for example, a frame tilt sensor that moves together with the side plate can be provided directly on the side plate, or, additionally or alternatively, the tilt of the side plate relative to the machine frame can be determined, for example from the vertical adjustment of two lifting devices of the side plate that are arranged one behind the other in the working direction. Additionally or alternatively, tilt determination in relation to the side plate can furthermore be provided on just one side of the ground milling machine 2, or alternatively on both sides of the machine or milling drum, as indicated by way of example in FIG. 17 by the side-plate tilt sensors 25A (right-hand side of the ground milling machine) and 25B (left-hand side of the ground milling machine).

Additionally or alternatively, the control unit can obtain information on further operating parameters by means of suitable sensors, for example by means of operating parameters of the drive motor of the ground milling machine using a sensor 26 (for example in terms of speed, operating status), operating parameters of the milling drum using a sensor 27 (for example in terms of speed), operating parameters of one or more of the traction devices by means of one or more sensors 28 (for example in terms of direction of rotation and/or speed of travel), etc.

On the basis of the above-described parameters, comprising at least the sensor data of the sensors 22 and 23 and optionally additionally taking account of further sensor data on operating parameters, as indicated above by way of example, the control unit 17 generates actuating signals 31 for at least one of the at least one lifting devices, which connects at least one rear traction device to the machine frame of the ground milling machine 2 in a height-adjustable manner. This can be done, for example, in the manner explained in more detail in FIG. 14. To maintain and/or restore the zero position or parallel position of the machine frame with respect to the subgrade or with respect to a reference line, for example a horizontal, in extreme cases use can be made solely of longitudinal-tilt data considered by the control unit regarding at least one ground contact element, preferably one of the rear traction devices, and the machine frame. For instance, it is not particularly necessary to measure the absolute or relative vertical adjustment in or changes to the stroke position of one or more lifting devices. While this can be determined as a further operating parameter and supplied to the control unit 17, it is not essential for carrying out the method according to the invention. In this respect, stroke-position sensors 29A and 29B for rear traction devices and 30A and 30B for front traction devices are optional. Further, it is possible that the control unit carries out a plausibility check on the basis of one or more of the above-described parameters and/or their alterations. For example, the control unit can verify with this plausibility check if the machine is currently moving, e.g. using a speed sensor or any other sensor that is able to detect if the machine is currently driving or not, and if for example the rear traction devices are currently running into the milling bed over the initial milling edge (ingress milling edge) or at the end of the milling process are running out of the milling bed over the terminal milling edge (egress milling edge).

With reference again to FIG. 1, it is apparent from the above description that the method according to the invention can thus optionally be expanded with further method steps.

FIG. 18 to 20 show a further workflow, specifically the lowering and ingress of the milling drum in the subgrade until the desired milling depth is reached, and orienting the lowered machine frame in a position running in parallel with the starting position. The sequence shown can be readily applied to any miller having a milling drum 16 arranged between the front and rear traction devices 6 and 7 in the working direction A. The difference from the sequences discussed in the previous figures is substantially that the rear region is first lowered by retracting the rear lifting devices 8B, which is then tracked by the front region through retraction of the front lifting devices 8A once the desired milling depth is reached. FIG. 18 shows a starting position with the milling drum raised. The LVF and LHF run in parallel with the subgrade, as does the LMR (in each case determined, for example, by means of the sensors N1 to N3). FIG. 19 shows the machine 2 with the rear region lowered. In this respect, the milling drum has, for example, already gone so far down into the subgrade as to reach the desired milling depth. The machine frame is thus tilted relative to the ground surface by the angle W (LMR). By FIG. 20, the front lifting devices 8A have now also been retracted so far that the machine-frame longitudinal tilt LMR is back at the starting tilt, i.e. zero in this embodiment example. Reference is made to the above statements as regards the individual components of the machine in FIG. 18 to 20 and their mode of operation.

FIG. 21A to 21E now show the behavior of different operating parameters relative to one another, as can be used by the control unit 17 in order to control the re-orientation of the machine in parallel with the subgrade, as shown in FIG. 18 to 20. As already described above, the machine-frame longitudinal tilt LMR assumes a positive angular value W from FIG. 18 to FIG. 19 by lowering the rear region, whereas the longitudinal tilt of the traction devices (LHF and/or LVF) remains unchanged. A possible operating parameter to be used by the control unit 17 to identify an operating scenario and carry out a plausibility check can, for example, be monitoring of the speed, which in this case is zero. For the operation shown in FIG. 18 to 20, the machine thus does not move from the spot (the speed line in FIG. 21E at the lower edge is merely intended to illustrate that the speed in this case is constantly zero). As a result, the tilt change of the machine frame can be attributed solely to a change in the stroke position of the lifting devices and not to a change in the ground condition. Additionally or alternatively, the control unit 17 can also use the fact that the rear lifting columns are retracted. The vertical adjustment of the front lifting devices 8A from FIG. 19 to FIG. 20 can now, for example, be controlled automatically by the control unit 17, specifically until such a point as the machine-frame longitudinal tilt resumes the starting value (zero in this case).

It goes without saying that in principle the tracking need not occur until the lifting devices have been retracted as far as to the planned final position. Furthermore, the tracking can be performed in portions or incrementally, whereby the machine thus carries out a slight rocking movement in the longitudinal direction of the machine during the lowering and/or raising, for example. For the embodiment shown in FIGS. 18 and 21E, this can mean, for example, that the movements shown therein do not strictly proceed separately one after the other, but rather the retraction of the front lifting devices is initiated by the control unit whenever a machine-frame longitudinal-tilt threshold LMR has been exceeded, for example. This can even be selected such that the machine frame is lowered only by a comparatively small machine-frame longitudinal tilt LMR practically in parallel with the ground.

Figure 22:
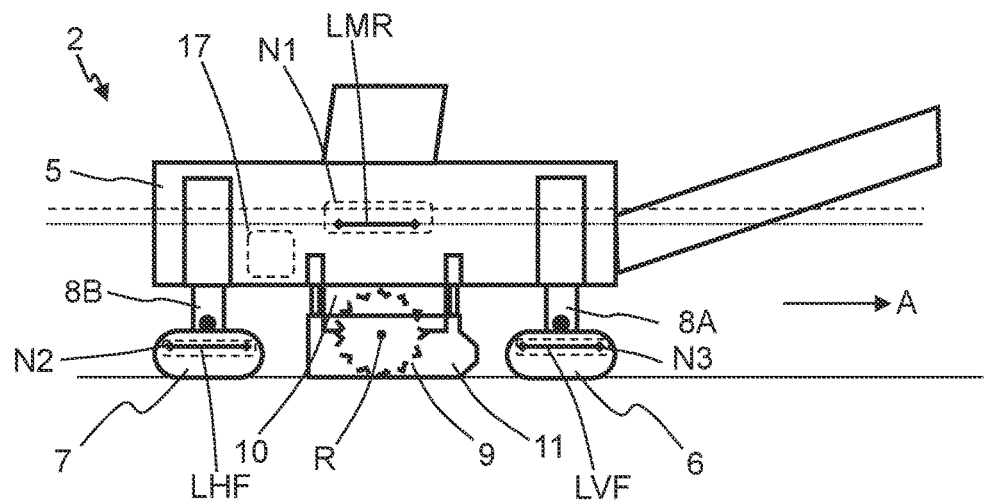
FIGS. 22-25: illustrate a workflow at the start of milling, the individual figures specifically showing the following operating scenarios.
Figure 23:
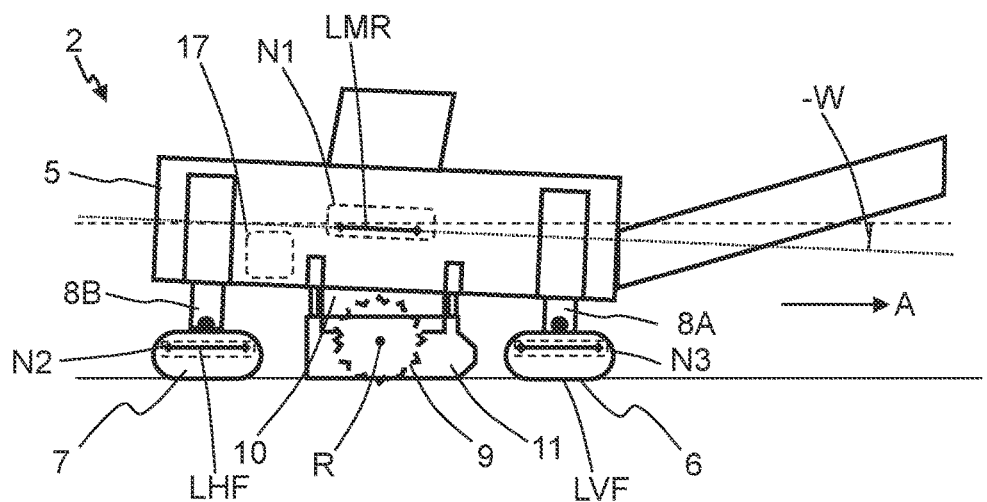
Figure 24:
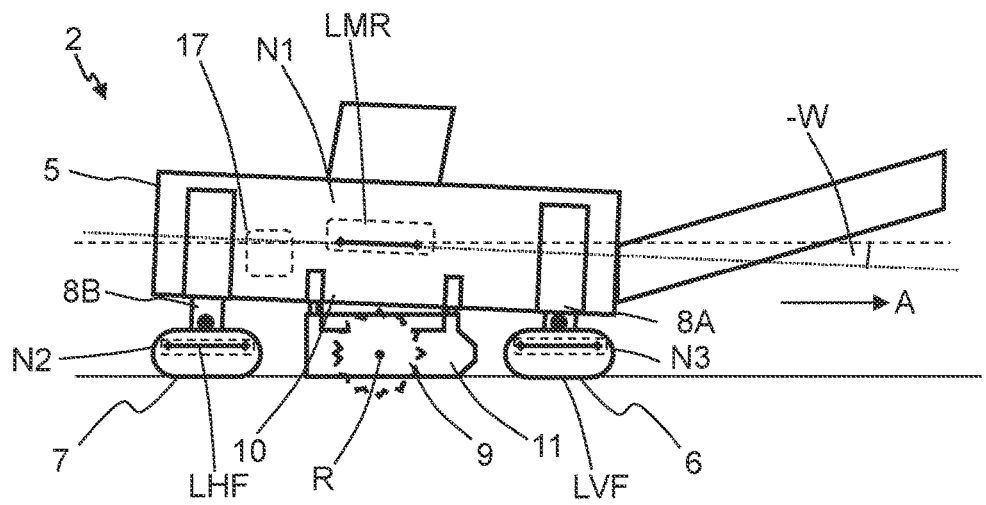
Figure 25:
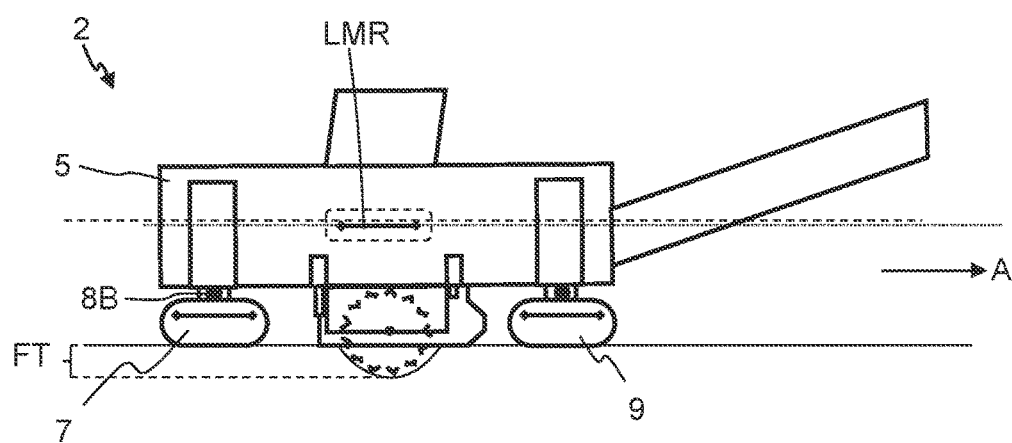
Figure 26A:
FIGS. 26A-26E: are overviews of tilt data (FIGS. 26A and B), stroke positions (of the lifting devices of the front traction devices in FIG. 26C and the lifting devices of the rear traction devices in FIG. 26D) and travel speed (FIG. 26E).
Figure 26B:
Figure 26C:
Figure 26D:
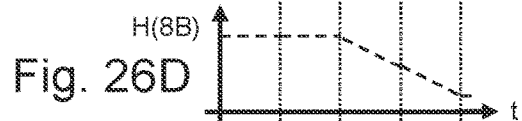
Figure 26E:
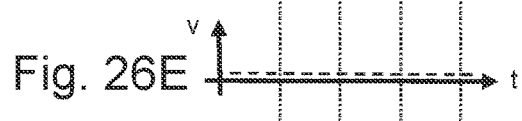

In principle, this can even go so far as to provide phases in which front and rear lifting devices are adjusted concurrently or simultaneously. One option for achieving this is shown in more detail, by way of example, in FIG. 25 to 26E, although the principle illustrated therein should not be deemed limiting in terms of either the type of ground milling machine or the operating scenario used as an example. In this context, FIG. 22 to 25 show various positions of the ground milling machine 2 when the milling drum has gone down into the subgrade so far as to reach the desired milling depth FT. By contrast, FIG. 26A to 26E are further overviews of tilt data (FIGS. 26A and B), stroke positions (of the lifting devices of the front traction devices in FIG. 26C and the lifting devices of the rear traction devices in FIG. 26D) and travel speed (FIG. 26E) for the sequence shown in FIG. 22 to 25. Reference is made substantially to the explanations regarding the previous figures, in particular in relation to the overviews in FIGS. 14A to E and 21A to E. In FIG. 22, the ground milling machine 2 is in the zero position (similar to FIG. 3). Starting from the position in FIG. 22, in which the milling drum has not yet gone down into the subgrade, the milling drum 9 is now lowered further by retracting the front lifting devices 8A. As a result, the machine-frame longitudinal tilt rises in terms of magnitude. This is illustrated by way of example in particular in FIGS. 26A and 26C. In FIG. 23, the machine-frame longitudinal tilt LMR reaches a predefined threshold GW (in this case, −GW in absolute terms) in terms of magnitude. This threshold can be stored in the control unit and, for example, specified by the driver or ex works. Once the threshold GW is reached, the rear lifting devices 8B are retracted at the same time as the further retraction of the front lifting devices 8A and in a manner controlled automatically by the control unit, in such a way that the machine-frame longitudinal tilt value is kept constantly at the threshold GW (specifically −GW). This is shown in the phase from FIG. 23 to FIG. 24, and can in particular additionally be seen from FIGS. 26A, 26C and 26D. In FIG. 24, the front lifting columns 8A have reached their final position. From here, by FIG. 25 the rear lifting columns 8B have been tracked until the machine-frame longitudinal tilt LMR has reached its starting value again, in particular the zero position or parallel to the zero position. During the operation shown in FIG. 22 to 25, the longitudinal tilt of the ground contact element LHF does not vary (FIG. 26B). Moreover, the machine does not move in the working direction A (FIG. 26E). However, it is also possible for the above-described threshold-based simultaneous adjustment of the front and rear traction devices 8A and 8B to be carried out while the ground milling machine 2 is travelling, for example when travelling over a ground obstacle.

What is claimed is:

1. A method to control height adjustment of a height-adjustable running gear of a self-propelled ground milling machine, wherein the ground milling machine has
a machine frame;
front and rear traction devices, wherein at least one of the traction devices is connected to the machine frame by at least one height-adjustable lifting device;
a milling drum mounted on the machine frame;
a frame tilt sensor arranged on the machine frame and configured to detect tilt of the machine frame in a working direction;
at least one ground-contact-element tilt sensor, arranged on a ground contact element, which is adjustable relative to the machine frame, and configured to detect tilt of the ground contact element in the working direction;
a control unit which is configured to control the at least one height-adjustable lifting device depending on tilt data determined by the frame tilt sensor and the at least one ground-contact-element tilt sensor; and
the method comprising:
a) determining and monitoring a tilt of the machine frame and/or a change in the tilt of the machine frame in the working direction, and determining and monitoring a tilt of the ground contact element and/or a change in the tilt of the ground contact element in the working direction; and/or
b) determining and monitoring a tilt difference between the tilt of the machine frame and/or the change in the tilt of the machine frame in the working direction, and the tilt of the ground contact element and/or the change in the tilt of the ground contact element in the working direction; and
c) controlling a height adjustment of the at least one height-adjustable lifting device depending on the determined and monitored tilts and/or changes in the tilts of the machine frame and the ground contact element and/or depending on the tilt difference; and
on a basis of at least one operating parameter of the ground milling machine and the determined and monitored tilt and/or change in tilt and/or tilt difference, the control unit carries out a plausibility check to ascertain whether or not the change in tilt and/or the tilt difference is associated with a milling process; and
wherein the ground milling machine comprises a ground condition sensor for a spatial detection of a ground condition as the at least one operating parameter, wherein the ground condition sensor sends data determined thereby to the control unit by a data line, and wherein the control unit is configured so as to control height adjustment of the at least one height-adjustable lifting device by also taking account of the data of the ground condition sensor.

2. The method according to claim 1, wherein determining the tilt and/or the change in the tilt of the ground contact element and/or the tilt difference comprises determining tilt and/or a change in tilt of a crawler track and/or a side plate.

3. The method according to claim 1, wherein the determining and monitoring according to steps a) and/or b) are performed in a manner dependent on a distance travelled and/or time.

4. The method according to claim 1, wherein the at least one height-adjustable lifting device further comprises at least one front or rear height-adjustable lifting device;
wherein to control the height adjustment, performing at least one of
determining an operating status of the milling drum;
determining an operating status of at least one of the front and rear traction devices;
determining an operating status of a drive motor; and
determining a lifting status of the at least one front or rear height-adjustable lifting device.

5. The method according to claim 4 wherein the drive motor is a diesel engine or a hydraulic motor.

6. The method according to claim 1, wherein steps a) and/or b) are performed separately from one another on two sides of the ground milling machine.

7. The method according to claim 1, wherein:
at least one threshold in relation to an absolute tilt and/or the change in tilt and/or the tilt difference is stored in the control unit;
monitoring by the control unit is performed to ascertain whether the absolute tilt and/or the change in tilt and/or the tilt difference exceeds or drops below the at least one threshold; and
if the value exceeds or falls below the threshold, the control unit initiates measures that counteract tipping of the ground milling machine.

8. The method according to claim 1, wherein the at least one height-adjustable lifting device further comprises at least one front height-adjustable lifting device and at least one rear height-adjustable lifting device; and
wherein height adjustment of the at least one front height-adjustable lifting device is controlled at a same time as height adjustment of the at least one rear height-adjustable lifting device.

9. The method according to claim 1, wherein the ground milling machine is a road miller.

10. A self-propelled ground milling machine, comprising:
a machine frame;
front and rear traction devices, wherein at least one of the traction devices is connected to the machine frame by at least one height-adjustable lifting device;
a milling drum mounted on the machine frame;
a frame tilt sensor arranged on the machine frame and configured to detect and monitor tilt and/or tilt change of the machine frame in a working direction;
at least one ground-contact-element tilt sensor, arranged on a ground contact element, which is adjustable relative to the machine frame, and configured to detect and monitor the tilt and/or the tilt change of the ground contact element in the working direction;
a control unit which is configured to control height adjustment of the at least one height-adjustable lifting device, wherein the control unit controls the height adjustment depending on tilt data determined and/or monitored by the frame tilt sensor and the at least one ground-contact-element tilt sensor;
the control unit comprises a plausibility check, which is configured such as to distinguish between tilt changes associated with a milling process and tilt changes not associated with the milling process; and
a ground condition sensor for a spatial detection of a ground condition as an operating parameter, wherein the ground condition sensor sends data determined thereby to the control unit by a data line, and wherein the control unit is configured so as to control height adjustment of the at least one height-adjustable lifting device by also taking account of the data of the ground condition sensor.

11. The self-propelled ground milling machine according to claim 10, wherein the frame tilt sensor and/or the ground-contact-element tilt sensor is/are a gyro sensor.

12. The self-propelled ground milling machine according to claim 10, wherein the ground-contact-element tilt sensor is arranged on a crawler track or on a side plate of the milling drum case or on a ground glide.

13. The self-propelled ground milling machine according to claim 10, wherein at least two ground-contact-element tilt sensors are present, arranged on a respective ground contact element that is adjustable relative to the machine frame, the two ground contact elements being arranged on two sides of the ground milling machine that are opposite one another in relation to a horizontal longitudinal central axis of the ground milling machine.

14. The self-propelled ground milling machine according to claim 10, wherein the ground milling machine has two front and/or rear traction devices, each connected to the machine frame by a front or rear height-adjustable lifting device, respectively, and each of the two front and/or rear traction devices comprising a ground-contact-element tilt sensor connected to the control unit.

15. The self-propelled ground milling machine according to claim 10, wherein the control unit has threshold-based tipping monitoring.

16. The self-propelled ground milling machine according to claim 10, wherein at least one additional sensor sends data determined thereby to the control unit by a data line, and the control unit being configured so as to control height adjustment of the at least one height-adjustable lifting device by also taking account of the data of the at least one additional sensor; and wherein the at least one additional sensor comprises at least one of the following additional sensors:
an operation sensor of a drive motor of the ground milling machine, which determines a current speed or a current power output or a current operating status of the drive motor;
an operation sensor of a hydraulic motor or a hydraulic pump, which determines a current delivery rate or a current speed of the hydraulic motor or hydraulic pump;
a speed sensor, which determines a current speed level of the milling drum;
a travel sensor, which determines a distance covered by the front or rear traction devices per unit of time;
a lift path sensor, which determines a relative height adjustment and/or an absolute lifting position of the at least one height-adjustable lifting device;
a transverse-tilt sensor, which determines a tilt of the machine frame in relation to a horizontal reference plane transverse to the working direction.

17. The self-propelled ground milling machine according to claim 16, wherein the ground condition sensor comprises a laser scanner or a camera.

* * * * *